United States Patent
Ihara et al.

(10) Patent No.: US 9,455,476 B2
(45) Date of Patent: Sep. 27, 2016

(54) ELECTROLYTE AND SECONDARY BATTERY

(75) Inventors: Masayuki Ihara, Fukishima (JP); Hiroyuki Yamaguchi, Fukushima (JP); Tadahiko Kubota, Kanagawa (JP)

(73) Assignee: SONY CORPORATION, Tokyo (JP)

(*) Notice: Subject to any disclaimer, the term of this patent is extended or adjusted under 35 U.S.C. 154(b) by 1145 days.

(21) Appl. No.: 12/693,622

(22) Filed: Jan. 26, 2010

(65) Prior Publication Data

US 2010/0196764 A1    Aug. 5, 2010

(30) Foreign Application Priority Data

Feb. 4, 2009  (JP) .............................. P2009-023566

(51) Int. Cl.

| | |
|---|---|
| *H01M 10/0569* | (2010.01) |
| *H01M 4/133* | (2010.01) |
| *H01M 4/134* | (2010.01) |
| *H01M 4/36* | (2006.01) |
| *H01M 4/38* | (2006.01) |
| *H01M 4/48* | (2010.01) |
| *H01M 4/525* | (2010.01) |
| *H01M 4/587* | (2010.01) |
| *H01M 4/62* | (2006.01) |
| *H01M 10/052* | (2010.01) |
| *H01M 10/0525* | (2010.01) |
| *H01M 10/0567* | (2010.01) |
| *H01M 10/0568* | (2010.01) |

(52) U.S. Cl.
CPC ......... *H01M 10/0569* (2013.01); *H01M 4/133* (2013.01); *H01M 4/134* (2013.01); *H01M 4/366* (2013.01); *H01M 4/38* (2013.01); *H01M 4/48* (2013.01); *H01M 4/525* (2013.01); *H01M 4/587* (2013.01); *H01M 4/62* (2013.01); *H01M 10/052* (2013.01); *H01M 10/0525* (2013.01); *H01M 10/0567* (2013.01); *H01M 10/0568* (2013.01); *H01M 2300/0025* (2013.01); *H01M 2300/0091* (2013.01); *Y02E 60/122* (2013.01)

(58) Field of Classification Search
CPC .............. H01M 10/0569; H01M 10/0568; H01M 10/0567; H01M 10/0525; H01M 10/052; H01M 4/133; H01M 4/134; H01M 4/38; H01M 4/587; H01M 2300/028; H01M 2300/025; Y02E 60/122

USPC ........... 429/330, 199, 200, 329, 331, 218.1; 252/62.2

See application file for complete search history.

(56) References Cited

U.S. PATENT DOCUMENTS

| | | | |
|---|---|---|---|
| 2001/0038949 A1 | 11/2001 | Hatazaki et al. | |
| 2004/0191629 A1 | 9/2004 | Itaya et al. | |
| 2006/0127777 A1* | 6/2006 | Ihara et al. | ................... 429/326 |
| 2007/0037063 A1 | 2/2007 | Choi et al. | |
| 2008/0090154 A1 | 4/2008 | Ihara et al. | |
| 2008/0292970 A1 | 11/2008 | Ihara et al. | |
| 2008/0311472 A1 | 12/2008 | Yamaguchi et al. | |

FOREIGN PATENT DOCUMENTS

| | | |
|---|---|---|
| JP | 07-240232 | 9/1995 |
| JP | 08-167427 | 6/1996 |
| JP | 2001-297790 | 10/2001 |
| JP | 2005-108440 | 4/2005 |
| JP | 2005-190978 | 7/2005 |
| JP | 2006-210161 | 8/2006 |
| JP | 2007-019027 | 1/2007 |
| JP | 2007-123242 | 5/2007 |
| JP | 2008-010414 | 1/2008 |
| JP | 2008-192391 | 8/2008 |
| JP | 2008-288144 | 11/2008 |
| JP | 2008-293687 | 12/2008 |
| JP | 2008-308421 | 12/2008 |
| JP | 2009-021229 | 1/2009 |

OTHER PUBLICATIONS

Arai et al. "Binary mixed solvent electrolytes containing trifluoropropylene carbonate for lithium batteries", Journal of the Electrochemical Society, 149 (2), pp. A217-A226, (2002).*

European Search Report dated Sep. 27, 2010, for corresponding European Patent Appln. No. 10000773.1.

Japanese Office Action issued Jun. 28, 2011 for Japanese Application No. 2009-023566.

* cited by examiner

*Primary Examiner* — Laura Weiner

(74) *Attorney, Agent, or Firm* — Chip Law Group

(57) ABSTRACT

A secondary battery capable of achieving superior cycle characteristics, superior storage characteristics, and superior swollenness characteristics is provided. The secondary battery includes a cathode, an anode, and an electrolyte containing a solvent and an electrolyte salt. The solvent contains halogenated cyclic ester carbonate. The halogenated cyclic ester carbonate is a cyclic compound that has one or more fluorine groups, one or more fluorinated alkyl groups, and a carbonyl group.

17 Claims, 7 Drawing Sheets

ELECTROLYTE AND SECONDARY BATTERY

CROSS REFERENCES TO RELATED APPLICATIONS

The present application contains subject matter related to that disclosed in Japanese Priority Patent Application JP 2009-23566 filed in the Japan Patent Office on Feb. 4, 2009, the entire contents of which is hereby incorporated by reference.

BACKGROUND

The present application relates to an electrolyte containing halogenated cyclic ester carbonate and a secondary battery including the same.

In recent years, portable electronic devices such as combination cameras, digital still cameras, mobile phones, and notebook personal computers have been widely used, and it is strongly demanded to reduce their size and weight and to achieve their long life. Accordingly, as a power source for the portable electronic devices, a battery, in particular a light-weight secondary batter capable of providing a high energy density has been developed.

Specially, a lithium ion secondary battery using insertion and extraction of lithium ions for charge and discharge reaction, a lithium metal secondary battery using precipitation and dissolution of lithium metal and the like are extremely prospective, since such secondary batteries are able to provide a higher energy density compared to a lead battery and a nickel cadmium battery.

The secondary battery includes an electrolyte together with a cathode and an anode. The cathode has a cathode active material layer on a cathode current collector. The anode has an anode active material layer on an anode current collector. The electrolyte contains a solvent and an electrolyte salt.

The electrolyte functioning as a medium for charge and discharge reaction largely affects performance of the secondary battery. Thus, various studies have been made on the composition of the electrolyte. Specifically, to improve the cycle characteristics and the like, as a solvent, halogenated carbonate such as trifluoropropylene carbonate, fluoroethylene carbonate, and difluoroethylene carbonate is used (for example, refer to Japanese Unexamined Patent Application Publication Nos. 2001-297790, 2005-190978, 2007-019027, and 07-240232). Further, carbonate having a halogenated alkyl group is used (for example, refer to Japanese Unexamined Patent Application Publication No. 2006-210161).

SUMMARY

In these years, the high performance and the multi functions of the portable electronic devices are increasingly developed, and the electric power consumption thereof tends to be increased. Thus, charge and discharge of the secondary battery are frequently repeated, and the cycle characteristics and the storage characteristics tend to be lowered. Accordingly, further improvement of the cycle characteristics and the storage characteristics of the secondary battery has been aspired. In this case, in order to use the secondary battery frequently and safely, it is also important to inhibit battery swollenness associated with using the secondary battery.

In view of the foregoing disadvantages, it is desirable to provide an electrolyte with which superior cycle characteristics, superior storage characteristics, and superior swollenness characteristics are able to be obtained and a secondary battery using the same.

According to an embodiment, it is desirable to provide an electrolyte containing a solvent and an electrolyte salt, wherein the solvent contains halogenated cyclic ester carbonate shown in Formula 1. Further, according to an embodiment, it is desirable to provide a secondary battery including a cathode, an anode, and an electrolyte containing a solvent and an electrolyte salt, wherein the electrolytic solution thereof has the foregoing composition.

Formula 1

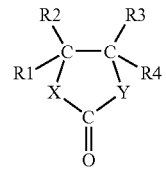
(1)

In the formula, X and Y are an oxo group or a thio group. R1 to R4 are a hydrogen group, a halogen group, an alkyl group, or a halogenated alkyl group. At least one thereof is a halogen group and at least one thereof is a halogenated alkyl group.

According to the electrolyte of the embodiment of the invention, the solvent contains halogenated cyclic ester carbonate shown in Formula 1. Thus, chemical stability is improved more than in a case that other halogenated cyclic ester carbonate not corresponding to Formula 1 is contained. Therefore, according to the secondary battery including the electrolyte of the embodiment of the invention, superior cycle characteristics, superior storage characteristics, and superior swollenness characteristics are able to be obtained.

Additional features and advantages are described herein, and will be apparent from the following Detailed Description and the figures.

DETAILED DESCRIPTION

Figure 1:
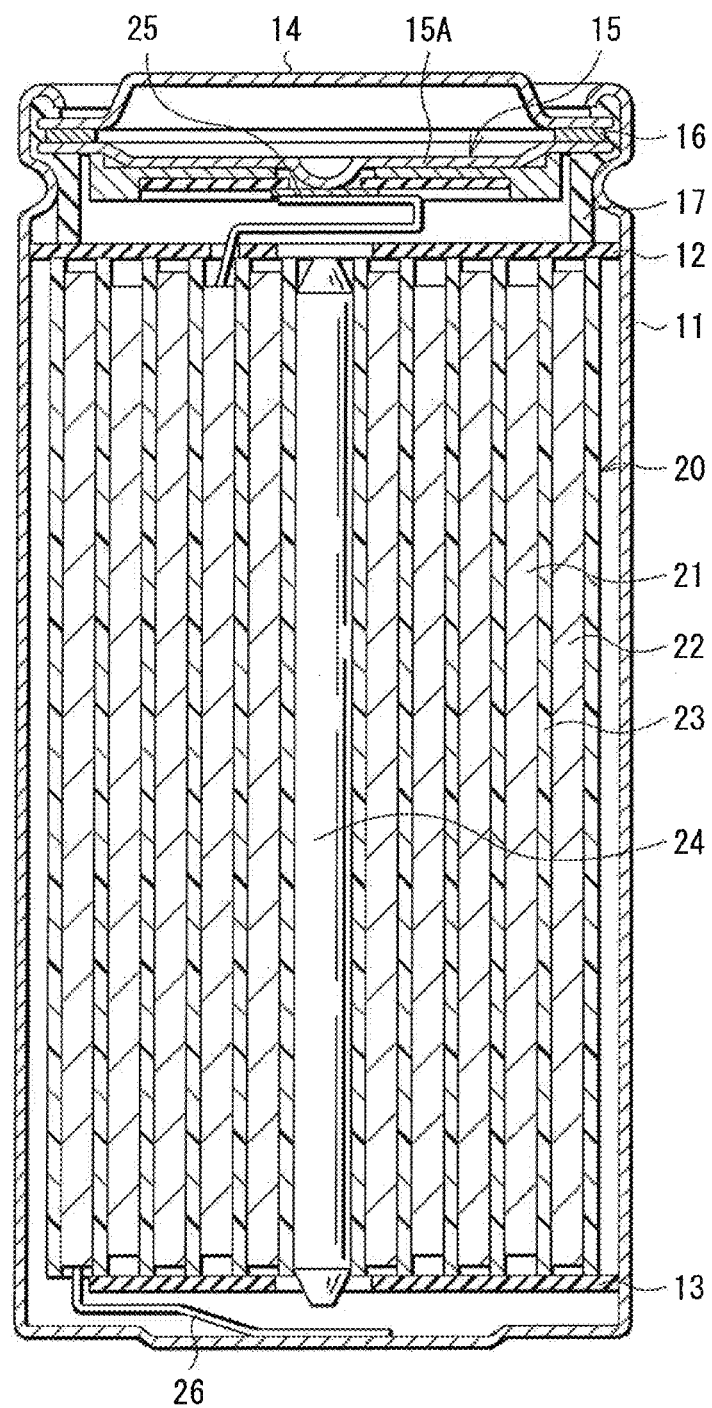
FIG. 1 is a cross sectional view illustrating a structure of a first secondary battery including an electrolyte according to an embodiment of the invention.

The present application will be described in detail with reference to the drawings, according to an embodiment.

1. Electrolyte
2. Electrochemical device including electrolyte (secondary battery)
2-1. First secondary battery (lithium ion secondary battery: cylindrical type)
2-2. Second secondary battery (lithium metal secondary battery: cylindrical type)
2-3. Third secondary battery (lithium ion secondary battery: laminated film type)

1. Electrolyte

An electrolyte according to the embodiment of the invention is used for, for example, an electrochemical device such as a secondary battery. In the electrolyte, an electrolyte salt is dissolved in a solvent. However, the electrolyte may contain other material such as various additives in addition to the solvent and the electrolyte salt.

Solvent

The solvent contains a halogenated cyclic ester carbonate shown in Formula 1, since thereby chemical stability of the electrolyte is able to be improved than in a case that a halogenated cyclic ester carbonate not corresponding to Formula 1 is contained.

Formula 1

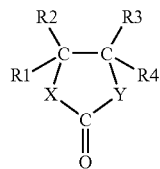

(1)

In the formula, X and Y are an oxo group or a thio group. R1 to R4 are a hydrogen group, a halogen group, an alkyl group, or a halogenated alkyl group. At least one thereof is a halogen group and at least one thereof is a halogenated alkyl group.

The halogenated cyclic ester carbonate shown in Formula 1 (hereinafter simply referred to as "halogenated cyclic ester carbonate") is a cyclic compound having one or more halogen groups, one or more halogenated alkyl groups, and a carbonyl group (—C(=O)—). One halogenated cyclic ester carbonate may be used, or two or more halogenated cyclic ester carbonates may be used. The "halogenated alkyl group" is a group obtained by substituting at least partial hydrogen of an alkyl group with halogen.

X and Y in Formula 1 may be the same group, or may be a different group. Further, in the case where two or more halogen groups or two or more halogenated alkyl groups exist in R1 to R4, the two or more halogen groups or the two or more halogenated alkyl groups may be the same group, or may be a different group from each other. The same is applied to a case that two or more groups other than the halogen group and the halogenated alky group exist.

Specially, X and Y are preferably the same group, and both X and Y are more preferably an oxo group, since such a group is easily available, and the chemical stability of the electrolyte is thereby increased.

The halogen type is not particularly limited, but specially, fluorine is preferable, since thereby the chemical stability of the electrolyte is increased more than the other halogens.

Thus, as a halogen group or a halogenated alkyl group, a fluorine group or a fluorinated alkyl group is respectively preferable. In particular, as a fluorinated alkyl group, a perfluoro alkyl group is more preferable.

As a halogenated cyclic ester carbonate, for example, the compound shown in Formula 2 is preferable, since such a compound is easily available, and the chemical stability of the electrolyte is increased. The halogenated cyclic ester carbonate is a compound having an oxo group as X and Y and having a trifluoromethyl group as a halogenated alkyl group.

Formula 2

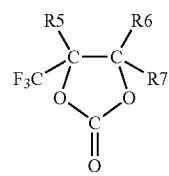

In the formula, R5 to R7 are a hydrogen group, a halogen group, or an alkyl group. At least one thereof is a halogen group.

Examples of halogenated cyclic ester carbonates include the compounds shown in Formula 1-1 to Formula 1-26. In Formula 1-1 to Formula 1-13, both X and Y are an oxo group. Meanwhile, in Formula 1-14 to Formula 1-26, both X and Y are a thio group. Though not specifically shown, X and Y may be composed of a combination of an oxo group and a thio group. In this case, in a halogenated cyclic ester carbonate in which sections other than X and Y are in the unsymmetrical shape, one of X and Y may be an oxo group (or a thio group).

Formulas 1-1 to 1-13

(1-1)

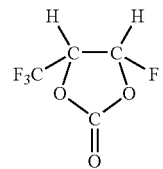

(1-2)

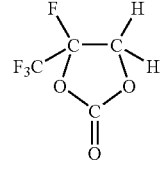

(1-3)

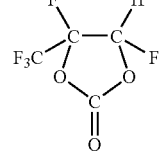

(1-4)

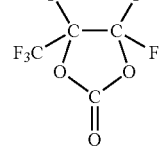

(1-5) 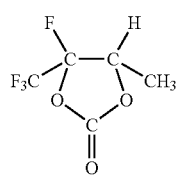
(1-6) 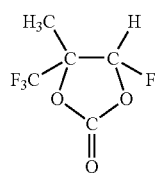
(1-7) 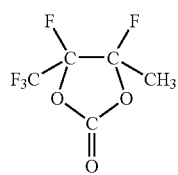
(1-8) 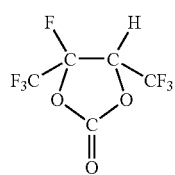
(1-9) 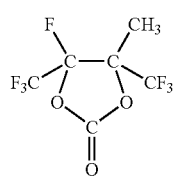
(1-10) 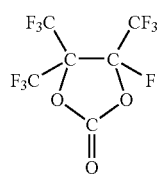
(1-11) 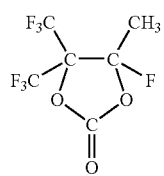
(1-12) 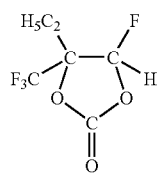
(1-13) 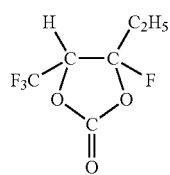
Formulas 1-14 to 1-26
(1-14) 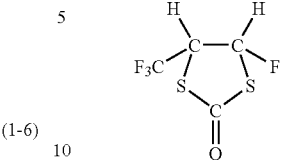
(1-15) 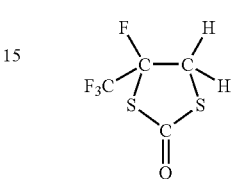
(1-16) 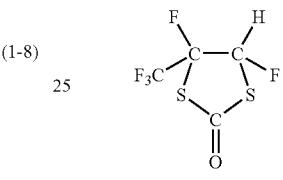
(1-17) 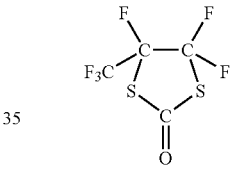
(1-18) 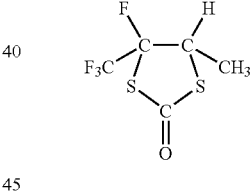
(1-19) 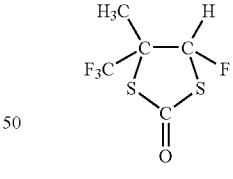
(1-20) 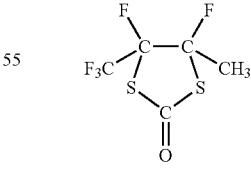
(1-21) 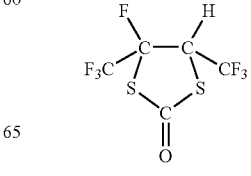

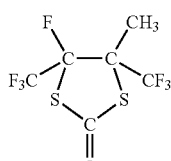
(1-22)

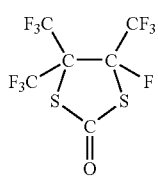
(1-23)

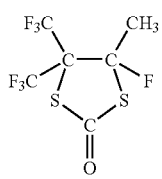
(1-24)

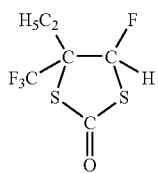
(1-25)

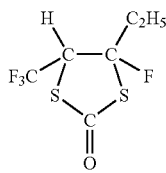
(1-26)

The halogenated cyclic ester carbonates include a geometric isomer. More specifically, by taking Formula 1-1 as an example, Formula 1-1 includes the cis isomer and the trans isomer shown in Formula 1-1A and Formula 1-1B.

Formula 1-1A and 1-1B

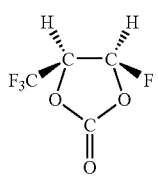
(1-1A)

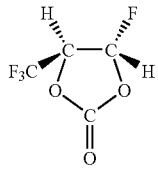
(1-1B)

Specially, as described above, the compounds shown in Formula 1-1 to Formula 1-13 in which X and Y are an oxo group are preferable, and the compound shown in Formula 1-1 or Formula 1-2 is more preferable, since such a compound is easily available, and the chemical stability of the electrolyte is improved. Further, since the structure is relatively simple, superior solubility and superior compatibility are thereby obtained.

However, the halogenated cyclic ester carbonate is not necessarily limited to the compounds shown in Formula 1-1 to Formula 1-26, but may be other compound as long as such a compound has the structure shown in Formula 1.

The content of the halogenated cyclic ester carbonate in the solvent is not particularly limited, but is preferably from 0.01 wt % to 50 wt % both inclusive, and more preferably from 0.01 wt % to 10 wt % both inclusive, since thereby the chemical stability of the electrolyte is sufficiently increased. In the case where the electrolyte together with other material are used for an electrochemical device, the appropriate range of the content of the halogenated cyclic ester carbonate may change according to the type of such other material. Examples of such other material include an anode active material in the case where the electrolyte is used for a secondary battery. For the appropriate range of the content of the halogenated cyclic ester carbonate according to the type of anode active material, a description will be given later.

The solvent may contain other material as long as the solvent contains the foregoing halogenated cyclic ester carbonate. Such other material is, for example, one or more of the after-mentioned nonaqueous solvents such as an organic solvent (other than a solvent corresponding to the halogenated cyclic ester carbonate).

Examples of nonaqueous solvents include the following. That is, examples thereof include ethylene carbonate, propylene carbonate, butylene carbonate, dimethyl carbonate, diethyl carbonate, ethyl methyl carbonate, methylpropyl carbonate, γ-butyrolactone, γ-valerolactone, 1,2-dimethoxyethane, and tetrahydrofuran. Further examples thereof include 2-methyltetrahydrofuran, tetrahydropyran, 1,3-dioxolane, 4-methyl-1,3-dioxolane, 1,3-dioxane, and 1,4-dioxane. Furthermore, examples thereof include methyl acetate, ethyl acetate, methyl propionate, ethyl propionate, methyl butyrate, methyl isobutyrate, trimethyl methyl acetate, and trimethyl ethyl acetate. Furthermore, examples thereof include acetonitrile, glutaronitrile, adiponitrile, methoxyacetonitrile, 3-methoxypropionitrile, N,N-dimethylformamide, N-methylpyrrolidinone, and N-methyloxazolidinone. Furthermore, examples thereof include N,N'-dimethylimidazolidinone, nitromethane, nitroethane, sulfolane, trimethyl phosphate, and dimethyl sulfoxide. Superior characteristics are thereby obtained in an electrochemical device including the electrolyte. Such characteristics mean, for example, a battery capacity, cycle characteristics, storage characteristics and the like in the case where the electrolyte is used for a secondary battery.

Specially, at least one of ethylene carbonate, propylene carbonate, dimethyl carbonate, diethyl carbonate, and ethyl methyl carbonate is preferable, since thereby superior battery capacity, superior cycle characteristics, superior storage characteristics and the like are obtained. In this case, a combination of a high viscosity (high dielectric constant) solvent (for example, specific inductive $\in \geq 30$) such as ethylene carbonate and propylene carbonate and a low viscosity solvent (for example, viscosity$\leq 1$ mPa·s) such as dimethyl carbonate, ethylmethyl carbonate, and diethyl carbonate is more preferable. Thereby, dissociation property of the electrolyte salt and ion mobility are improved.

In particular, the solvent preferably contains at least one of the unsaturated carbon bond cyclic ester carbonates shown in Formula 3 to Formula 5. Thereby, a stable protective film is formed on the surface of the electrode at the time of electrode reaction, and thus decomposition reaction of the electrolyte is inhibited. The "unsaturated carbon bond cyclic ester carbonate" is a cyclic ester carbonate having an unsaturated bond. The content of the unsaturated carbon bond cyclic ester carbonate in the solvent is preferably from 0.01 wt % to 10 wt % both inclusive, but may be in a range out of the foregoing range. However, the type of the unsaturated carbon bond cyclic ester carbonate is not limited to the after-mentioned examples but may be other type, as long as such other type has the structures shown in Formula 3 to Formula 5.

Formula 3

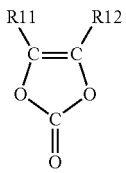

(3)

In the formula, R11 and R12 are a hydrogen group or an alkyl group.

Formula 4

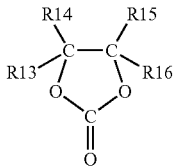

(4)

In the formula, R13 to R16 are a hydrogen group, an alkyl group, a vinyl group, or an aryl group. At least one of R13 to R16 is the vinyl group or the aryl group.

Formula 5

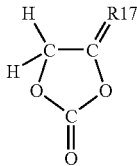

(5)

In the formula, R17 is an alkylene group.

The unsaturated carbon bond cyclic ester carbonate shown in Formula 3 is a vinylene carbonate compound. Examples of vinylene carbonate compounds include the following compounds. That is, examples thereof include vinylene carbonate, methylvinylene carbonate, and ethylvinylene carbonate. Further, examples thereof include 4,5-dimethyl-1,3-dioxole-2-one, 4,5-diethyl-1,3-dioxole-2-one, 4-fluoro-1,3-dioxole-2-one, and 4-trifluoromethyl-1,3-dioxole-2-one. Specially, vinylene carbonate is preferable, since vinylene carbonate is easily available and provides high effect.

The unsaturated carbon bond cyclic ester carbonate shown in Formula 4 is a vinylethylene carbonate compound. Examples of vinylethylene carbonate compounds include the following compounds. That is, examples thereof include vinylethylene carbonate, 4-methyl-4-vinyl-1,3-dioxolane-2-one, and 4-ethyl-4-vinyl-1,3-dioxolane-2-one. Further examples thereof include 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Specially, vinylethylene carbonate is preferable, since vinylethylene carbonate is easily available, and provides high effect. It is needless to say that all of R13 to R16 may be the vinyl group or the aryl group. Otherwise, it is possible that some of R13 to R16 are the vinyl group, and the others thereof are the aryl group.

The unsaturated carbon bond cyclic ester carbonate shown in Formula 5 is a methylene ethylene carbonate compound. Examples of methylene ethylene carbonate compounds include the following compounds. That is, examples thereof include 4-methylene-1,3-dioxolane-2-one, 4,4-dimethyl-5-methylene-1,3-dioxolane-2-one, and 4,4-diethyl-5-methylene-1,3-dioxolane-2-one. The methylene ethylene carbonate compound may have one methylene group (compound shown in Formula 5), or have two methylene groups.

The unsaturated carbon bond cyclic ester carbonate may be catechol carbonate having a benzene ring or the like, in addition to the compounds shown in Formula 3 to Formula 5.

Further, the solvent preferably contains at least one of the halogenated chain ester carbonate shown in Formula 6 and other halogenated cyclic ester carbonates shown in Formula 7 (hereinafter simply referred to as "other halogenated cyclic ester carbonates"). Thereby, a stable protective film is formed on the surface of the electrode at the time of electrode reaction, and thus decomposition reaction of the electrolyte is inhibited. "Halogenated chain ester carbonate" is a chain ester carbonate containing halogen as an element. Further, "other halogenated cyclic ester carbonates" are a cyclic ester carbonate containing halogen as an element except for the halogenated cyclic ester carbonate shown in Formula 1. R21 to R26 in Formula 6 may be identical or different. The same is applied to R27 to R30 in Formula 7. The content of the halogenated cyclic ester carbonate and other halogenated cyclic ester carbonates in the solvent is preferably, for example, from 0.01 wt % to 50 wt % both inclusive, but may be in a range other than the foregoing range. However, the type of the halogenated chain ester carbonate and other halogenated cyclic ester carbonates is not necessarily limited to the compounds described below but may be other compound, as long as the compound has the structure shown in Formula 6 or Formula 7.

Formula 6

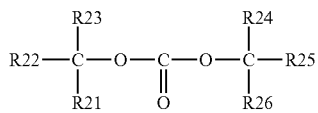

(6)

In the formula, R21 to R26 are a hydrogen group, a halogen group, an alkyl group, or a halogenated alkyl group. At least one of R21 to R26 is the halogen group or the halogenated alkyl group.

Formula 7

(7)

In the formula, R27 to R30 are a hydrogen group, a halogen group, an alkyl group, or a halogenated alkyl group. At least one of R27 to R30 is the halogen group or the halogenated alkyl group.

In the halogenated chain ester carbonate or other halogenated cyclic ester carbonates, the halogen type is not particularly limited, but specially, fluorine, chlorine, or bromine is preferable, and fluorine is more preferable since thereby higher effect is obtained compared to other halogen. The number of halogen is more preferably two than one, and further may be three or more, since thereby an ability to form a protective film is improved, and a more rigid and stable protective film is formed. Accordingly, decomposition reaction of the electrolyte is further inhibited.

Examples of the halogenated chain ester carbonate include fluoromethyl methyl carbonate, bis(fluoromethyl) carbonate, and difluoromethyl methyl carbonate. Examples of other halogenated cyclic ester carbonates include the compounds shown in Formula 7-1 to Formula 7-20. Other halogenated cyclic ester carbonates include a geometric isomer. Specially, 4-fluoro-1,3-dioxolane-2-one shown in Formula 7-1 or 4,5-difluoro-1,3-dioxolane-2-one shown in Formula 7-3 is preferable, and the latter is more preferable. In particular, as 4,5-difluoro-1,3-dioxolane-2-one, a trans isomer is more preferable than a cis isomer, since the trans isomer is easily available and provides high effect.

Formulas 7-1 to 7-20

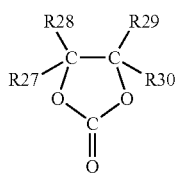
(7-1)

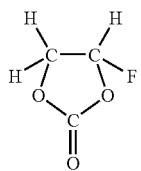
(7-2)

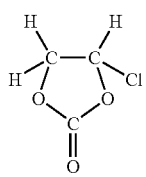
(7-3)

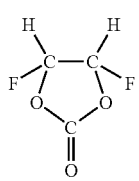

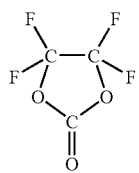
(7-4)

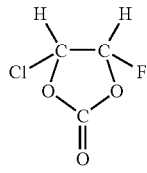
(7-5)

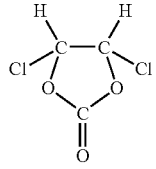
(7-6)

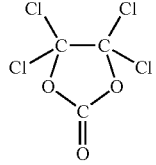
(7-7)

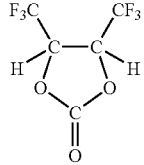
(7-8)

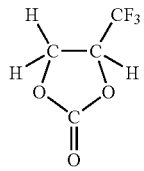
(7-9)

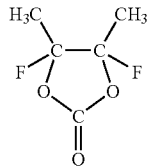
(7-10)

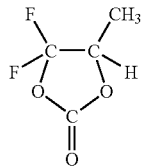
(7-11)

(7-12)

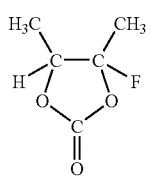
(7-13)

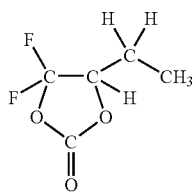
(7-14)

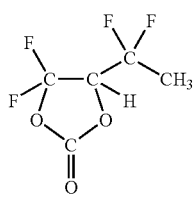
(7-15)

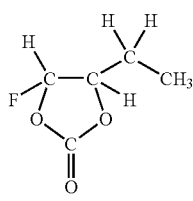
(7-16)

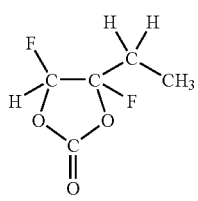
(7-17)

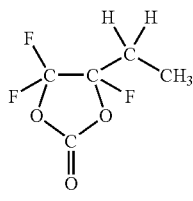
(7-18)

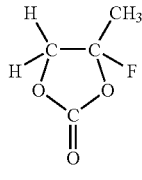
(7-19)

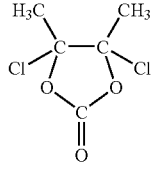
(7-20)

Further, the solvent preferably contains sultone (cyclic sulfonic ester), since thereby the chemical stability of the electrolyte is further improved. Examples of the sultone include propane sultone and propene sultone. The sultone content in the solvent is preferably, for example, from 0.5 wt % to 5 wt % both inclusive, but may be in a range other than the foregoing range. The type of sultone is not necessarily limited to the foregoing type, but may be other type.

Further, the solvent preferably contains an acid anhydride since the chemical stability of the electrolyte is thereby further improved. Examples of acid anhydrides include a carboxylic anhydride, a disulfonic anhydride, and a carboxylic sulfonic anhydride. Examples of carboxylic anhydrides include succinic anhydride, glutaric anhydride, and maleic anhydride. Examples of disulfonic anhydrides include ethane disulfonic anhydride and propane disulfonic anhydride. Examples of carboxylic sulfonic anhydrides include sulfobenzoic anhydride, sulfopropionic anhydride, and sulfobutyric anhydride. The content of the acid anhydride in the solvent is preferably, for example, from 0.5 wt % to 5 wt % both inclusive, but may be in a range other than the foregoing range. The type of acid anhydride is not necessarily limited to the foregoing type, but may be other type.

Electrolyte Salt

The electrolyte salt contains, for example, one or more light metal salts such as a lithium salt. The electrolyte salt may include, for example, a salt other than a light metal salt.

Examples of lithium salts include the following. That is, examples thereof include lithium hexafluorophosphate, lithium tetrafluoroborate, lithium perchlorate, and lithium hexafluoroarsenate. Further, examples thereof include lithium tetraphenylborate ($LiB(C_6H_5)_4$), lithium methanesulfonate ($LiCH_3SO_3$), lithium trifluoromethane sulfonate ($LiCF_3SO_3$), and lithium tetrachloroaluminate ($LiAlCl_4$). Further, examples thereof include dilithium hexafluorosilicate ($Li_2SiF_6$), lithium chloride (LiCl), and lithium bromide (LiBr), lithium monofluorophosphate ($LiPFO_3$), and lithium difluorophosphate ($LiPF_2O_2$). Thereby, superior characteristics are obtained in an electrochemical device including the electrolyte. The type of electrolyte salt is not necessarily limited to the foregoing type, but may be other type.

Specially, at least one of lithium hexafluorophosphate, lithium tetrafluoroborate, lithium perchlorate, and lithium hexafluoroarsenate is preferable, and lithium hexafluorophosphate is more preferable, since the internal resistance is lowered, and thus higher effect is obtained.

In particular, the electrolyte salt preferably contains at least one of the compounds shown in Formula 8 to Formula 10, since thereby higher effect is obtained. R31 and R33 in Formula 8 may be identical or different. The same is applied to R41 to R43 in Formula 9 and R51 and R52 in Formula 10. The type of the electrolyte salt is not necessarily limited to the type described below but may be other compound, as long as the compound has the structure shown in Formula 8 to Formula 10.

Formula 8

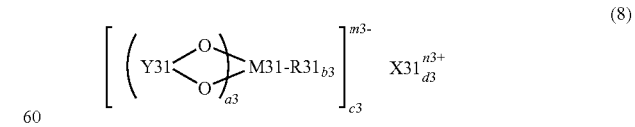

In the formula, X31 is a Group 1 element or a Group 2 element in the long period periodic table or aluminum. M31 is a transition metal element, a Group 13 element, a Group 14 element, or a Group 15 element in the long period periodic table. R31 is a halogen group. Y31 is —(O═)C—R32-C(═O)—, —(O═)C—C(R33)$_2$-, or —(O═)C—C (=O)—. R32 is an alkylene group, a halogenated alkylene group, an arylene group, or a halogenated arylene group. R33 is an alkyl group, a halogenated alkyl group, an aryl group, or a halogenated aryl group. a3 is one of integer numbers 1 to 4. b3 is 0, 2, or 4. c3, d3, m3, and n3 are one of integer numbers 1 to 3.

Formula 9

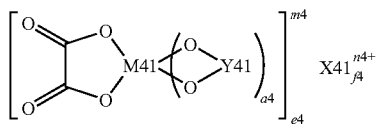
(9)

In the formula, X41 is a Group 1 element or a Group 2 element in the long period periodic table. M41 is a transition metal element, a Group 13 element, a Group 14 element, or a Group 15 element in the long period periodic table. Y41 is —(O=)C—(C(R41)$_2$)$_{b4}$-C(=O)—, —(R43)$_2$C—(C(R42)$_2$)$_{c4}$-C(=O)—, —(R43)$_2$C—(C(R42)$_2$)$_{c4}$-C(R43)$_2$-, —(R43)$_2$C—(C(R42)$_2$)$_{c4}$-S(=O)$_2$—, —(O=)$_2$S—(C(R42)$_2$)$_{d4}$-S(=O)$_2$—, or —(O=)C—(C(R42)$_2$)$_{d4}$-S(=O)$_2$—. R41 and R43 are a hydrogen group, an alkyl group, a halogen group, or a halogenated alkyl group. At least one of R41/R43 is respectively the halogen group or the halogenated alkyl group. R42 is a hydrogen group, an alkyl group, a halogen group, or a halogenated alkyl group. a4, e4, and n4 are 1 or 2. b4 and d4 are one of integer numbers 1 to 4. c4 is one of integer numbers 0 to 4. f4 and m4 are one of integer numbers 1 to 3.

Formula 10

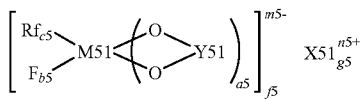
(10)

In the formula, X51 is a Group 1 element or a Group 2 element in the long period periodic table. M51 is a transition metal element, a Group 13 element, a Group 14 element, or a Group 15 element in the long period periodic table. Rf is a fluorinated alkyl group with the carbon number from 1 to 10 both inclusive or a fluorinated aryl group with the carbon number from 1 to 10 both inclusive. Y51 is —(O=)C—(C(R51)$_2$)$_{d5}$-C(=O)—, —(R52)$_2$C—(C(R51)$_2$)$_{d5}$-C(=O)—, —(R52)$_2$C—(C(R51)$_2$)$_{d5}$-C(R52)$_2$-, —(R52)$_2$C—(C(R51)$_2$)$_{d5}$-S(=O)$_2$—, —(O=)$_2$S—(C(R51)$_2$)$_{e5}$-S(=O)$_2$—, or —(O=)C—(C(R51)$_2$)$_{e5}$-S(=O)$_2$—. R51 is a hydrogen group, an alkyl group, a halogen group, or a halogenated alkyl group. R52 is a hydrogen group, an alkyl group, a halogen group, or a halogenated alkyl group, and at least one thereof is the halogen group or the halogenated alkyl group. a5, f5, and n5 are 1 or 2. b5, c5, and e5 are one of integer numbers 1 to 4. d5 is one of integer numbers 0 to 4. g5 and m5 are one of integer numbers 1 to 3.

Group 1 element represents hydrogen, lithium, sodium, potassium, rubidium, cesium, and francium. Group 2 element represents beryllium, magnesium, calcium, strontium, barium, and radium. Group 13 element represents boron, aluminum, gallium, indium, and thallium. Group 14 element represents carbon, silicon, germanium, tin, and lead. Group 15 element represents nitrogen, phosphorus, arsenic, antimony, and bismuth.

Examples of the compound shown in Formula 8 include the compounds shown in Formula 8-1 to Formula 8-6. Examples of the compound shown in Formula 9 include the compounds shown in Formula 9-1 to Formula 9-8. Examples of the compound shown in Formula 10 include the compound shown in Formula 10-1.

Formulas 8-1 to 8-6

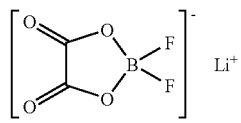
(8-1)

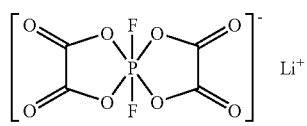
(8-2)

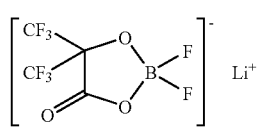
(8-3)

(8-4)

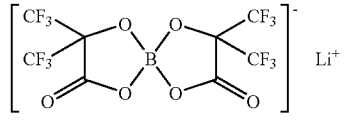
(8-5)

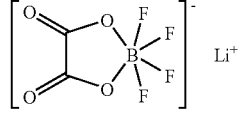
(8-6)

Formulas 9-1 to 9-8

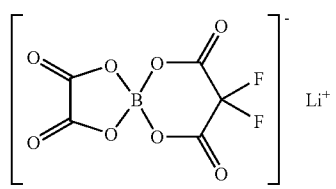
(9-1)

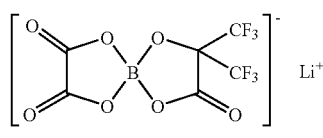
(9-2)

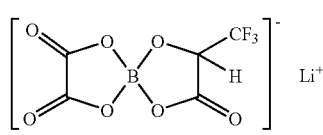
(9-3)

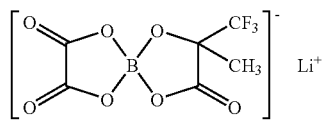
(9-4)

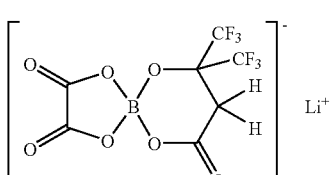

(9-5)

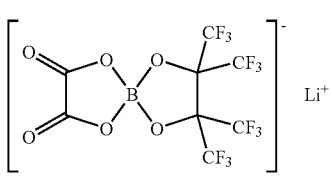

(9-6)

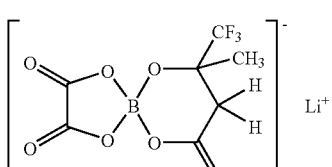

(9-7)

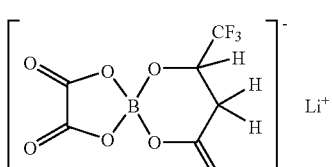

(9-8)

Formula 10-1

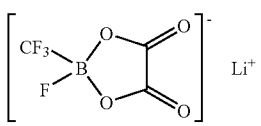

(10-1)

Further, the electrolyte salt preferably contains at least one of the compounds shown in Formula 11 to Formula 13, since thereby higher effect is obtained. m and n in Formula 11 may be identical or different. The same is applied to p, q, and r in Formula 13. The type of the electrolyte salt is not necessarily limited to the type described below but may be other compound, as long as the compound has the structure shown in Formula 11 to Formula 13.

Formula 11

$$LiN(C_mF_{2m+1}SO_2)(C_nF_{2n+1}SO_2) \quad (11)$$

In the formula, m and n are an integer number of 1 or more.

Formula 12

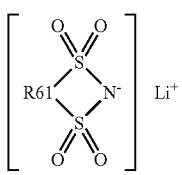

(12)

In the formula, R61 is a straight chain/branched perfluoro alkylene group with the carbon number from 2 to 4 both inclusive.

Formula 13

$$LiC(C_pF_{2p+1}SO_2)(C_qF_{2q+1}SO_2)(C_rF_{2r+1}SO_2) \quad (13)$$

In the formula, p, q, and r are an integer number of 1 or more.

The compound shown in Formula 11 is a chain imide compound. Examples of the compounds include the following compounds. That is, examples thereof include lithium bis(trifluoromethanesulfonyl)imide (LiN(CF$_3$SO$_2$)$_2$) and lithium bis(pentafluoroethanesulfonyl)imide (LiN(C$_2$F$_5$SO$_2$)$_2$). Further examples thereof include lithium (trifluoromethanesulfonyl)(pentafluoroethanesulfonyl)imide (LiN(CF$_3$SO$_2$)(C$_2$F$_5$SO$_2$)). Further examples thereof include lithium(trifluoromethanesulfonyl)(heptafluoropropanesulfonyl)imide (LiN(CF$_3$SO$_2$)(C$_3$F$_7$SO$_2$)). Further examples thereof include lithium(trifluoromethanesulfonyl)(nonafluorobutanesulfonyl)imide (LiN(CF$_3$SO$_2$)(C$_4$F$_9$SO$_2$)).

Examples of the compound shown in Formula 12 include a cyclic imide compound. Examples of the compounds include the compounds shown in Formula 12-1 to Formula 12-4.

Formulas 12-1 to 12-4

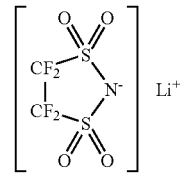

(12-1)

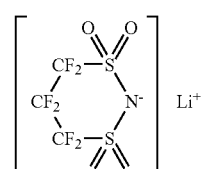

(12-2)

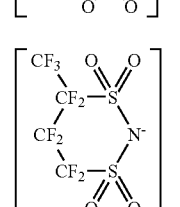

(12-3)

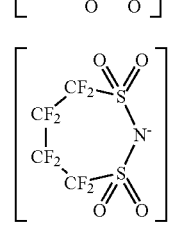

(12-4)

The compound shown in Formula 13 is a chain methyde compound. Examples of the compound include lithium tris(trifluoromethanesulfonyl)methyde (LiC(CF$_3$SO$_2$)$_3$).

The content of the electrolyte salt to the solvent is preferably from 0.3 mol/kg to 3.0 mol/kg both inclusive, since thereby high ion conductivity is obtained. The content of the electrolyte salt may be out of the foregoing range.

According to the electrolyte, the solvent contains the halogenated cyclic ester carbonate shown in Formula 1. Thus, compared to a case that a halogenated cyclic ester carbonate not corresponding to Formula 1 is contained, the chemical stability is improved. Examples of such other halogenated cyclic ester carbonates include the compounds shown in Formula 7-1 to Formula 7-19. Thus, since decomposition reaction of the electrolyte is inhibited at the time of electrode reaction, the electrolyte is able to contribute to improving performance of an electrochemical device including the electrolyte.

In particular, in the case where the halogenated cyclic ester carbonate is the compound shown in Formula 2, higher effect is able to be obtained. Further, in the case where the solvent contains at least one of an unsaturated carbon bond cyclic ester carbonate, a halogenated chain ester carbonate, other halogenated cyclic ester carbonates, sultone, and an acid anhydride, higher effect is able to be obtained. Further, in the case where the electrolyte salt contains at least one of lithium hexafluorophosphate, lithium tetrafluoroborate, lithium perchlorate, lithium hexafluoroarsenate, and the compounds shown in Formula 8 to Formula 13, higher effect is able to be obtained.

2. Electrochemical Device (Secondary Battery) Including Electrolyte

Next, a description will be given of usage examples of the foregoing electrolyte. In the description, a secondary battery will be taken as an example of electrochemical devices. The foregoing electrolyte is used as follows.

2-1. First Secondary Battery

Figure 2:
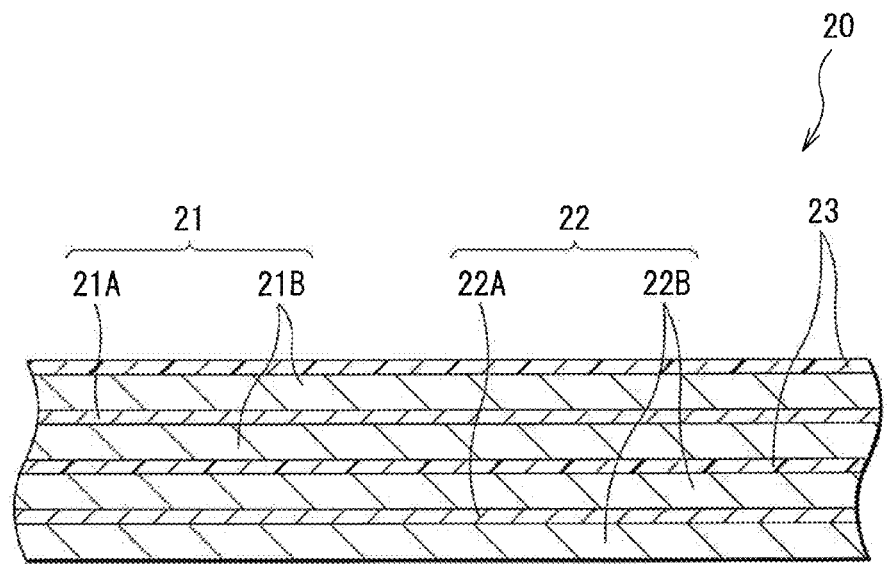
FIG. 2 is a cross sectional view illustrating an enlarged part of a spirally wound electrode body illustrated in FIG. 1.

FIG. 1 and FIG. 2 illustrate a cross sectional structure of a first secondary battery. FIG. 2 illustrates an enlarged part of a spirally wound electrode body 20 illustrated in FIG. 1. The secondary battery herein described is, for example, a lithium ion secondary battery in which the anode capacity is expressed by insertion and extraction of lithium ion as an electrode reactant.

Whole Structure of Secondary Battery

The secondary battery mainly contains the spirally wound electrode body 20 and a pair of insulating plates 12 and 13 inside a battery can 11 in the shape of an approximately hollow cylinder. The battery structure using such a battery can 11 is called cylindrical type.

The battery can 11 has a hollow structure in which one end of the battery can 11 is opened and the other end of the battery can 11 is closed. The battery can 11 is made of iron, aluminum, an alloy thereof or the like. In the case that the battery can 11 is made of iron, for example, plating of nickel or the like may be provided on the surface of the battery can 11. The pair of insulating plates 12 and 13 is arranged to sandwich the spirally wound electrode body 20 in between from the upper and the lower sides, and to extend perpendicularly to the spirally wound periphery face.

At the open end of the battery can 11, a battery cover 14, a safety valve mechanism 15, and a PTC (Positive Temperature Coefficient) device 16 are attached by being caulked with a gasket 17. Inside of the battery can 11 is hermetically sealed. The battery cover 14 is made of, for example, a material similar to that of the battery can 11. The safety valve mechanism 15 and the PTC device are provided inside of the battery cover 14. The safety valve mechanism 15 is electrically connected to the battery cover 14 through the PTC device 16. In the safety valve mechanism 15, in the case where the internal pressure becomes a certain level or more by internal short circuit, external heating or the like, a disk plate 15A flips to cut the electric connection between the battery cover 14 and the spirally wound electrode body 20. As temperature rises, the PTC device 16 increases the resistance (limits a current) to prevent abnormal heat generation resulting from a large current. The gasket 17 is made of, for example, an insulating material. The surface of the gasket 17 is coated with, for example, asphalt.

In the spirally wound electrode body 20, a cathode 21 and an anode 22 are layered with a separator 23 in between and spirally wound. For example, a center pin 24 may be inserted in the center of the spirally wound electrode body 20. In the spirally wound electrode body 20, a cathode lead 25 made of aluminum or the like is connected to the cathode 21, and an anode lead 26 made of nickel or the like is connected to the anode 22. The cathode lead 25 is electrically connected to the battery cover 14 by, for example, being welded to the safety valve mechanism 35. The anode lead 26 is, for example, welded and thereby electrically connected to the battery can 11.

Cathode

In the cathode 21, for example, a cathode active material layer 21B is provided on both faces of a cathode current collector 21A. However, the cathode active material layer 21B may be provided only on a single face of the cathode current collector 21A.

The cathode current collector 21A is made of, for example, aluminum, nickel, stainless or the like.

The cathode active material layer 21B contains, as a cathode active material, one or more cathode materials capable of inserting and extracting lithium ions. According to needs, the cathode active material layer 21B may contain other material such as a cathode binder and a cathode electrical conductor.

As the cathode material, a lithium-containing compound is preferable, since thereby a high energy density is able to be obtained. Examples of lithium-containing compounds include a composite oxide having lithium and a transition metal element as an element and a phosphate compound containing lithium and a transition metal element as an element. Specially, a compound containing at least one of cobalt, nickel, manganese, and iron as a transition metal element is preferable, since thereby a higher voltage is obtained. The chemical formula thereof is expressed by, for example, $Li_xM1O_2$ or $Li_yM2PO_4$. In the formula, M1 and M2 represent one or more transition metal elements. Values of x and y vary according to the charge and discharge state, and are generally in the range of $0.05 \leq x \leq 1.10$ and $0.05 \leq y \leq 1.10$.

Examples of composite oxides containing lithium and a transition metal element include a lithium-cobalt composite oxide ($Li_xCoO_2$), a lithium-nickel composite oxide ($Li_xNiO_2$), and a lithium-nickel composite oxide expressed by Formula 14. Examples of phosphate compounds having lithium and a transition metal element include lithium-iron phosphate compound ($LiFePO_4$) and a lithium-iron-manganese phosphate compound ($LiFe_{1-u}Mn_uPO_4$ (u<1)), since thereby a high battery capacity is obtained and superior cycle characteristics are obtained.

Formula 14

$$LiNi_{1-x}M_xO_2 \qquad (14)$$

In the formula, M is at least one of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony, and niobium. x is in the range of 0.005<x<0.5.

In addition, examples of cathode materials include an oxide, a disulfide, a chalcogenide, and a conductive polymer. Examples of oxides include titanium oxide, vanadium oxide, and manganese dioxide. Examples of disulfide include titanium disulfide and molybdenum sulfide. Examples of chalcogenide include niobium selenide. Examples of conductive polymer include sulfur, polyaniline, and polythiophene.

It is needless to say that the cathode material may be a material other than the foregoing compounds. Further, two or more of the foregoing cathode materials may be used by mixture arbitrarily.

Examples of cathode binders include a synthetic rubber such as styrene butadiene rubber, fluorinated rubber, and ethylene propylene diene; and a polymer material such as polyvinylidene fluoride. One thereof may be used singly, or a plurality thereof may be used by mixture.

Examples of cathode electrical conductors include a carbon material such as graphite, carbon black, acetylene black, and Ketjen black. Such a carbon material may be used singly, or a plurality thereof may be used by mixture. The cathode electrical conductor may be a metal material, a conductive polymer or the like as long as the material has the electric conductivity.

Anode

In the anode 22, for example, an anode active material layer 22B is provided on both faces of an anode current collector 22A. However, the anode active material layer 22B may be provided only on a single face of the anode current collector 22A.

The anode current collector 22A is made of, for example, copper, nickel, stainless or the like. The surface of the anode current collector 22A is preferably roughened. Thereby, due to the so-called anchor effect, the contact characteristics between the anode current collector 22A and the anode active material layer 22B are improved. In this case, it is enough that at least the surface of the anode current collector 22A opposed to the anode active material layer 22B is roughened. Examples of roughening methods include a method of forming fine particles by electrolytic treatment. The electrolytic treatment is a method of providing concavity and convexity by forming fine particles on the surface of the anode current collector 22A by using electrolytic method in an electrolytic bath. A copper foil formed by electrolytic method is generally called "electrolytic copper foil."

The anode active material layer 22B contains one or more anode materials capable of inserting and extracting lithium ions as an anode active material, and may also contain other material such as an anode binder and an anode electrical conductor according to needs. Details of the anode binder and the anode electrical conductor are, for example, respectively similar to those of the cathode binder and the cathode electrical conductor. In the anode active material layer 22B, the chargeable capacity of the anode material is preferably larger than the discharge capacity of the cathode 21 in order to prevent unintentional precipitation of lithium metal at the time of charge and discharge.

Examples of anode materials include a carbon material. In the carbon material, crystal structure change associated with insertion and extraction of lithium ions is extremely small. Thus, the carbon material provides a high energy density and superior cycle characteristics, and functions as an anode electrical conductor as well. Examples of carbon materials include graphitizable carbon, non-graphitizable carbon in which the spacing of (002) plane is 0.37 nm or more, and graphite in which the spacing of (002) plane is 0.34 nm or less. More specifically, examples of carbon materials include pyrolytic carbon, coke, glassy carbon fiber, an organic polymer compound fired body, activated carbon, and carbon black. Of the foregoing, the coke includes pitch coke, needle coke, and petroleum coke. The organic polymer compound fired body is obtained by firing and carbonizing a phenol resin, a furan resin or the like at appropriate temperature. The shape of the carbon material may be any of a fibrous shape, a spherical shape, a granular shape, and a scale-like shape.

Examples of anode materials include a material (metal material) containing at least one of metal elements and metalloid elements as an element. Such an anode material is preferably used, since a high energy density is able to be thereby obtained. Such a material may be a simple substance, an alloy, or a compound of a metal element or a metalloid element, may be two or more thereof, or may have one or more phases thereof at least in part. In the invention, "alloy" includes an alloy containing one or more metal elements and one or more metalloid elements, in addition to an alloy composed of two or more metal elements. Further, "alloy" may contain a nonmetallic element. The texture thereof includes a solid solution, a eutectic crystal (eutectic mixture), an intermetallic compound, and a texture in which two or more thereof coexist.

The foregoing metal element or the foregoing metalloid element is a metal element or a metalloid element capable of forming an alloy with lithium. Specifically, the foregoing metal element or the foregoing metalloid element is at least one of the following elements. That is, the foregoing metal element or the foregoing metalloid element is at least one of magnesium, boron, aluminum, gallium, indium (In), silicon, germanium (Ge), tin, lead (Pb), bismuth (Bi), cadmium (Cd), silver (Ag), zinc, hafnium (Hf), zirconium, yttrium, palladium (Pd), and platinum (Pt). Specially, at least one of silicon and tin is preferably used. Silicon and tin have the high ability to insert and extract lithium ion, and thus are able to provide a high energy density.

A material containing at least one of silicon and tin may be, for example, a simple substance, an alloy, or a compound of silicon or tin; two or more thereof; or a material having one or more phases thereof at least in part.

Examples of alloys of silicon include an alloy containing at least one of the following elements as an element other than silicon. Such an element other than silicon is tin, nickel, copper, iron, cobalt, manganese, zinc, indium, silver, titanium, germanium, bismuth, antimony, and chromium. Examples of compounds of silicon include a compound containing oxygen or carbon as an element other than silicon. The compounds of silicon may contain one or more of the elements described for the alloys of silicon as an element other than silicon.

Examples of an alloy or a compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, and $FeSi_2$. Further, examples thereof include $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $SnO_w$ ($0<w\leq2$), and $LiSiO$.

Examples of alloys of tin include an alloy containing at least one of the following elements as an element other than tin. Such an element is silicon, nickel, copper, iron, cobalt, manganese, zinc, indium, silver, titanium, germanium, bismuth, antimony, or chromium. Examples of compounds of tin include a compound containing oxygen or carbon. The compounds of tin may contain one or more elements described for the alloys of tin as an element other than tin. Examples of alloys or compounds of tin include $SnSiO_3$, $LiSnO$, and $Mg_2Sn$.

In particular, as a material containing silicon, for example, the simple substance of silicon is preferable, since a high battery capacity, superior cycle characteristics and the like are thereby obtained. "Simple substance" only means a general simple substance (may contain a slight amount of impurity), but does not necessarily mean a substance with purity of 100%.

Further, as a material containing tin, for example, a material containing a second element and a third element in addition to tin as a first element is preferable. The second element is, for example, at least one of the following elements. That is, the second element is one of cobalt, iron, magnesium, titanium, vanadium, chromium, manganese, nickel, copper, zinc, gallium, zirconium, niobium, molybdenum, silver, indium, cerium (Ce), hafnium, tantalum, tungsten (W), bismuth, and silicon. The third element is, for example, at least one of boron, carbon, aluminum, and phosphorus. In the case where the second element and the third element are contained, a high battery capacity, superior cycle characteristics and the like are obtained.

Specially, a material containing tin, cobalt, and carbon (SnCoC-containing material) is preferable. As the composition of the SnCoC-containing material, for example, the carbon content is from 9.9 wt % to 29.7 wt % both inclusive, and the ratio of tin and cobalt contents (Co/(Sn+Co)) is from 20 wt % to 70 wt % both inclusive, since a high energy density is obtained in such a composition range.

It is preferable that the SnCoC-containing material has a phase having tin, cobalt, and carbon. Such a phase preferably has a low crystalline structure or an amorphous structure. The phase is a reaction phase capable of being reacted with lithium. Due to existence of the reaction phase, superior characteristics are able to be obtained. The half bandwidth of the diffraction peak obtained by X-ray diffraction of the phase is preferably 1.0 deg or more based on diffraction angle of 2θ in the case where CuKα ray is used as a specific X ray, and the insertion rate is 1 deg/min. Thereby, lithium ions are more smoothly inserted and extracted, and reactivity with the electrolyte is decreased. In some cases, the SnCoC-containing material has a phase containing a simple substance or part of the respective elements in addition to the low crystalline or amorphous phase.

Whether or not the diffraction peak obtained by X-ray diffraction corresponds to the reaction phase capable of being reacted with lithium is able to be easily determined by comparison between X-ray diffraction charts before and after electrochemical reaction with lithium. For example, the position of the diffraction peak after electrochemical reaction with lithium is changed from the position of the diffraction peak before electrochemical reaction with lithium, the obtained diffraction peak corresponds to the reaction phase capable of being reacted with lithium. In this case, for example, the diffraction peak of the low crystalline or amorphous reaction phase is shown in the range of 2θ=20 to 50 deg. Such a reaction phase contains the foregoing element, and the low crystalline or amorphous structure may result from existence of carbon.

In the SnCoC-containing material, at least part of carbon as an element is preferably bonded with a metal element or a metalloid element as other element, since thereby cohesion or crystallization of tin or the like is inhibited. The bonding state of elements is able to be checked by, for example, X-ray Photoelectron Spectroscopy (XPS). In a commercially available apparatus, for example, as a soft X ray, Al—Kα ray, Mg—Kα ray or the like is used. In the case where at least part of carbon is bonded with a metal element, a metalloid element or the like, the peak of a synthetic wave of 1s orbit of carbon (C1s) is shown in a region lower than 284.5 eV. In the apparatus, energy calibration is made so that the peak of 4f orbit of gold atom (Au4f) is obtained in 84.0 eV. At this time, in general, since surface contamination carbon exists on the material surface, the peak of C1s of the surface contamination carbon is regarded as 284.8 eV, which is used as the energy standard. In XPS measurement, the waveform of the peak of C1s is obtained as a form including the peak of the surface contamination carbon and the peak of carbon in the SnCoC-containing material. Thus, for example, analysis is made by using commercially available software to isolate both peaks from each other. In the waveform analysis, the position of a main peak existing on the lowest bound energy is the energy standard (284.8 eV).

The SnCoC-containing material may further contain other element according to needs. Examples of other elements include at least one of silicon, iron, nickel, chromium, indium, niobium, germanium, titanium, molybdenum, aluminum, phosphorus, gallium, and bismuth.

In addition to the SnCoC-containing material, a material containing tin, cobalt, iron, and carbon (SnCoFeC-containing material) is also preferable. The composition of the SnCoFeC-containing material is able to be arbitrarily set. For example, a composition in which the iron content is set small is as follows. That is, the carbon content is from 9.9 wt % to 29.7 wt % both inclusive, the iron content is from 0.3 wt % to 5.9 wt % both inclusive, and the ratio of contents of tin and cobalt (Co/(Sn+Co)) is from 30 wt % to 70 wt % both inclusive. Further, for example, a composition in which the iron content is set large is as follows. That is, the carbon content is from 11.9 wt % to 29.7 wt % both inclusive, the ratio of contents of tin, cobalt, and iron ((Co+Fe)/(Sn+Co+Fe)) is from 26.4 wt % to 48.5 wt % both inclusive, and the ratio of contents of cobalt and iron (Co/(Co+Fe)) is from 9.9 wt % to 79.5 wt % both inclusive. In such a composition range, a high energy density is obtained. The physical property and the like (half bandwidth) of the SnCoFeC-containing material are similar to those of the foregoing SnCoC-containing material.

Further, examples of other anode materials include a metal oxide and a polymer compound. The metal oxide is, for example, iron oxide, ruthenium oxide, molybdenum oxide or the like. The polymer compound is, for example, polyacetylene, polyaniline, polypyrrole or the like.

It is needless to say that the anode material may be a material other than the foregoing materials. Further, two or more of the foregoing anode materials may be used by mixture arbitrarily.

The anode active material layer 22B is formed by, for example, coating method, vapor-phase deposition method, liquid-phase deposition method, spraying method, firing method (sintering method), or a combination of two or more of these methods. Coating method is a method in which, for example, a particulate anode active material is mixed with a binder or the like, the mixture is dispersed in a solvent, and the anode current collector is coated with the resultant. Examples of vapor-phase deposition methods include physical deposition method and chemical deposition method. Specifically, examples thereof include vacuum evaporation method, sputtering method, ion plating method, laser ablation method, thermal CVD (Chemical Vapor Deposition) method, and plasma CVD method. Examples of liquid-phase deposition methods include electrolytic plating method and electroless plating method. Spraying method is a method in which the anode active material is sprayed in a fused state or a semi-fused state. Firing method is, for example, a method in which after the anode current collector is coated by a procedure similar to that of coating method, heat treatment is provided at temperature higher than the melting point of the anode binder or the like. Examples of firing methods include a known technique such as atmosphere firing method, reactive firing method, and hot press firing method.

The anode active material is composed of, for example, a plurality of particles. That is, the anode active materiel layer 22B contains a plurality of particulate anode active materials (hereinafter referred to as "anode active material particles"). The anode active material particles are formed by, for example, vapor-phase deposition method or the like. However, the anode active material particles may be formed by a method other than vapor-phase deposition method.

In the case where the anode active material particles are formed by using a deposition method such as vapor-phase deposition method, the anode active material particles may have a single layer structure formed by a single deposition step or may have a multilayer structure formed by a plurality of deposition steps. However, in the case where evaporation method or the like associated with high heat is used at the time of deposition, the anode active material particles preferably have a multilayer structure. In this case, the deposition step of the anode material is divided into several steps (a plurality of thin layers of the anode material are sequentially formed and deposited), time that the anode current collector 22A is exposed at high heat is shortened compared to a case that the deposition is performed in a single deposition step. Thereby, the anode current collector 22A is hardly subject to thermal damage.

It is preferable that the anode active material particles are grown, for example, in the thickness direction of the anode active material layer 22B from the surface of the anode current collector 22A, and the anode active material particles are linked to the surface of the anode current collector 22A at the root thereof. Thereby, expansion and shrinkage of the anode active material layer 22B are inhibited at the time of charge and discharge. Further, it is preferable that the anode active material particles are formed by vapor-phase deposition method, liquid-phase deposition method, firing method or the like, and at least part of the interface with the anode current collector 22A is alloyed. In this case, at the interface in between, the element of the anode current collector 22A may be diffused in the anode active material particles; or the element of the anode active material particles may be diffused in the anode current collector 22A; or the respective elements may be diffused in each other.

In particular, the anode active material layer 22B preferably contains an oxide-containing film to cover the surface of the anode active material particles (region to be contacted with the electrolyte if the oxide-containing film is not provided). In this case, the oxide-containing film functions as a protective film for the electrolyte, and accordingly decomposition reaction of the electrolyte is inhibited at the time of charge and discharge. Thereby, the cycle characteristics, the storage characteristics and the like are improved. The oxide-containing film may cover the entire surface of the anode active material particles, or may cover only part thereof. Specially, the oxide-containing film preferably covers the entire surface of the anode active material particles, since thereby decomposition reaction of the electrolyte is further inhibited.

The oxide-containing film contains, for example, at least one of a silicon oxide, a germanium oxide, and a tin oxide. Specially, the oxide-containing film preferably contains the silicon oxide, since thereby the oxide-containing film easily covers the entire surface of the anode active material particles, and superior protective action is thereby obtained. It is needless to say that the oxide-containing film may contain an oxide other than the foregoing oxides.

The oxide-containing film is formed by, for example, vapor-phase deposition method, liquid-phase deposition method or the like. Specially, the oxide-containing film is preferably formed by liquid-phase deposition method, since thereby the oxide-containing film easily covers a wide range of the surface of the anode active material particles. Examples of liquid-phase deposition methods include liquid-phase precipitation method, sol gel method, coating method, and dip coating method. Specially, liquid-phase precipitation method, sol gel method, or dip coating method is preferable, and liquid-phase precipitation method is more preferable, since thereby higher effect is obtained. The oxide-containing film may be formed by a single formation method of the foregoing formation methods, or may be formed by two or more formation methods thereof.

Further, the anode active material layer 22B preferably contains a metal material containing a metal element not being alloyed with lithium as an element (hereinafter simply referred to as "metal material") in a gap inside the anode active material layer 22B. Thereby, the plurality of anode active materials are bound to each other with the metal material in between. In addition, expansion and shrinkage of the anode active material layer 22B are inhibited. Thereby, the cycle characteristics, the storage characteristics and the like are improved. For the details of "gap inside the anode active material layer 22B," a description will be given later (refer to FIGS. 5A to 6B).

Examples of the foregoing metal elements include at least one selected from the group consisting of iron, cobalt, nickel, zinc, and copper. Specially, cobalt is preferable, since thereby the metal material easily intrudes into the gap inside the anode active material layer 22B, and superior binding characteristics are obtained. It is needless to say that the metal element may be a metal element other than the foregoing metal elements. However, "metal material" herein is a comprehensive term, including not only a simple substance but also an alloy and a metal compound.

The metal material is formed by, for example, vapor-phase deposition method, liquid-phase deposition method or the like. Specially, the metal material is preferably formed by liquid-phase deposition method, since thereby the metal material easily intrudes into the gap inside the anode active material layer 22B. Examples of liquid-phase deposition methods include electrolytic plating method and non-electrolytic plating method. Specially, electrolytic plating method is preferable, since thereby the metal material more easily intrudes into the foregoing gap, and the formation time thereof is shortened. The metal material may be formed by a single formation method out of the foregoing formation methods, or may be formed by two or more formation methods thereof.

The anode active material layer 22B may contain only one of the oxide-containing film and the metal material, or may contain both thereof. However, in order to further improve the cycle characteristics and the like, the anode active material layer 22B preferably contains both thereof. In the case where the anode active material layer 22B contains only one thereof, in order to further improve the cycle characteristics and the like, the anode active material layer 22B preferably contains the oxide-containing film. In the case where the anode active material layer 22B contains both the oxide-containing film and the metal material, it is possible to firstly form any thereof. However, in order to further improve the cycle characteristics and the like, the oxide-containing film is preferably formed first.

A description will be given of a detailed structure of the anode 22 with reference to FIG. 3 to FIG. 6B.

First, a description will be given of a case that the anode active material layer 22B contains the plurality of anode active material particles and the oxide-containing film. FIG.

Figure 4:
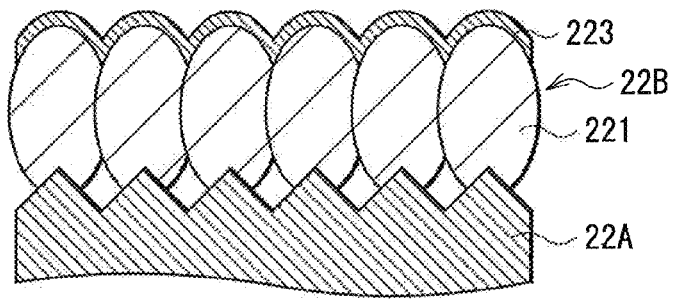
FIG. 4 is a cross sectional view schematically illustrating another structure of the anode illustrated in FIG. 2.

3 and FIG. 4 schematically illustrate a cross sectional structure of the anode 22. In this case, a case that the anode active material particles have a single layer structure is illustrated.

Figure 3:
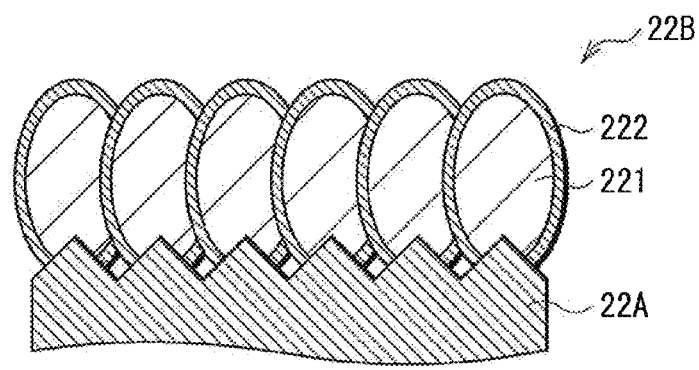
FIG. 3 is a cross sectional view schematically illustrating a structure of the anode illustrated in FIG. 2.

In the case illustrated in FIG. 3, for example, if the anode material is deposited on the anode current collector 22A by vapor-phase deposition method such as evaporation method, a plurality of anode active material particles 221 are formed on the anode current collector 22A. In this case, if the surface of the anode current collector 22A is roughened and a plurality of projection sections (for example, fine particles formed by electrolytic treatment) exist on the surface, the anode active material particles 221 are grown for every projection described above in the thickness direction. Thus, the plurality of anode active material particles 221 are arranged on the anode current collector 22A, and are linked to the surface of the anode current collector 22A at the root thereof. After that, for example, an oxide-containing film 222 is formed on the surface of the anode active material particles 221 by liquid-phase deposition method such as liquid-phase precipitation method. The oxide-containing film 222 covers almost entire surface of the anode active material particles 221. In this case, a wide range from the apex of the anode active material particles 221 to the root thereof is covered. Such a wide range covering state is characteristics shown in the case where the oxide-containing film 222 is formed by liquid-phase deposition method. That is, in the case where the oxide containing film 222 is formed by liquid-phase deposition method, covering action is applied not only to the apex of the oxide-containing film 222 but also to the root thereof, and thus the oxide-containing film 222 covers a portion from the apex of the oxide containing film 222 to the root thereof.

Meanwhile, in the case illustrated in FIG. 4, for example, after the plurality of anode active material particles 221 are formed by vapor-phase deposition method, the oxide-containing film 223 is formed similarly by vapor-phase deposition method. The oxide-containing film 223 covers only the apex of the anode active material particles 221. Such a small range covering state is characteristics shown in the case where the oxide-containing film 223 is formed by vapor-phase deposition method. That is, in the case where the oxide containing film 223 is formed by vapor-phase deposition method, covering action is applied to the apex of the anode active material particles 221 but not applied to the root thereof, and thus the oxide-containing film 223 does not cover the root thereof.

FIG. 3 illustrates the case that the anode active material layer 22B is formed by vapor-phase deposition method. However, the same state is also applied if the anode active material layer 22B is formed by other formation method such as coating method and sintering method. In these cases, the oxide-containing film 222 is formed to cover almost entire surface of the plurality of anode active material particles.

Next, a description will be given of a case that the anode active material layer 22B contains the metal material together with the plurality of anode active material particles. FIGS. 5A to 6B illustrate an enlarged cross sectional structure of the anode 22. In FIGS. 5A to 6B, FIGS. 5A and 6A illustrate a Scanning Electron Microscope (SEM) photograph (secondary electron image), and FIGS. 5B and 6B illustrate a schematic drawing of the SEM image illustrated in FIG. 5A and FIG. 6A. In this case, FIGS. 5A to 6B illustrate a case that the plurality of anode active material particles 221 have a multilayer structure.

Figure 5A:
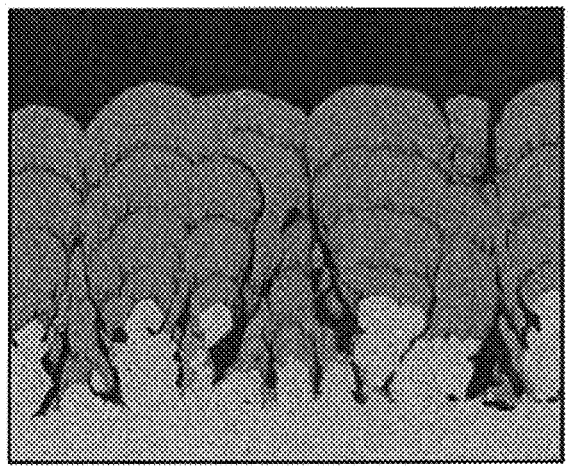
FIGS. 5A and 5B are an SEM photograph illustrating a cross sectional structure of the anode illustrated in FIG. 2 and a schematic drawing thereof.
Figure 5B:
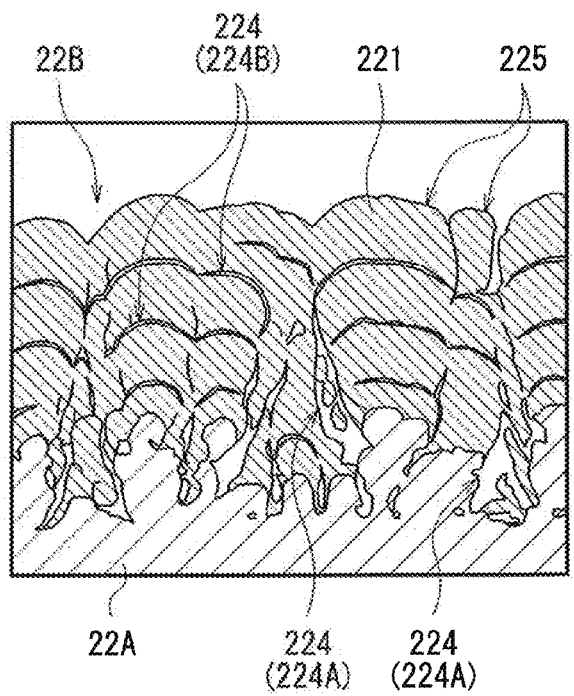

As illustrated in FIGS. 5A and 5B, in the case where the anode active material particles 221 have the multilayer structure, a plurality of gaps 224 are generated in the anode active material layer 22B due to the arrangement structure, the multilayer structure, and the surface structure of the plurality of anode active material particles 221. The gap 224 mainly includes two types of gaps 224A and 224B categorized according to the cause of generation. The gap 224A is a gap generated between adjacent anode active material particles 221. Meanwhile, the gap 224B is a gap generated between each layer in the anode active material particles 221.

On the exposed face (outermost surface) of the anode active material particle 221, a void 225 is generated in some cases. As a fibrous minute projection (not illustrated) is formed on the surface of the anode active material particles 221, the void 225 is generated between the projection sections. The void 225 may be generated entirely over the exposed face of the anode active material particles 221, or may be generated in only part thereof. Since the foregoing fibrous projection is generated on the surface of the anode active material particles 221 every time the anode active material particle 221 is deposited, the void 225 is generated between each layer in addition to on the exposed face of the anode active material particles 221 in some cases.

Figure 6A:
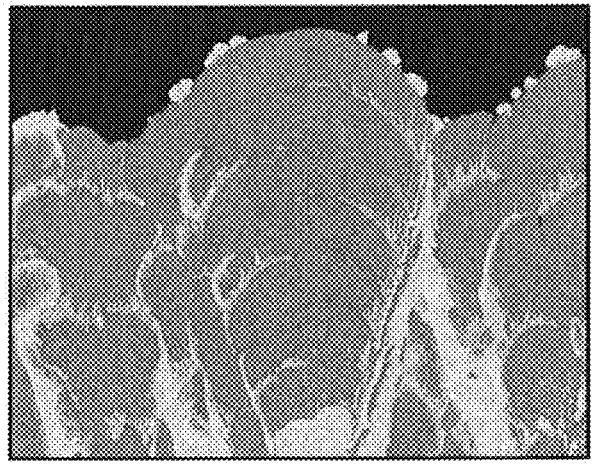
FIGS. 6A and 6B are an SEM photograph illustrating another cross sectional structure of the anode illustrated in FIG. 2 and a schematic drawing thereof.
Figure 6B:
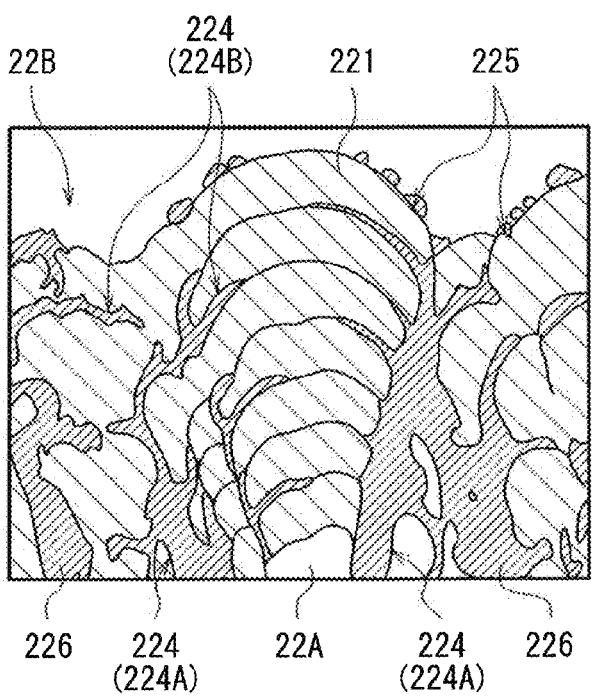

As illustrated in FIGS. 6A and 6B, the anode active material layer 22B has a metal material 226 in the gaps 224A and 224B. In this case, only one of the gaps 224A and 224B may have the metal material 226, but both the gaps 224A and 224B preferably have the metal material 226, since thereby higher effect is obtained.

The metal material 226 intrudes into the gap 224A between adjacent anode active material particles 221. More specifically, in the case where the anode active material particles 221 are formed by vapor-phase deposition method or the like, the anode active material particles 221 are grown for every projection existing on the surface of the anode current collector 22A as described above, and thus the gap 224A is generated between the adjacent anode active material particles 221. The gap 224A causes lowering of the binding characteristics of the anode active material layer 22B. Therefore, to improve the binding characteristics, the metal material 226 fills in the gap 224A. In this case, it is enough that part of the gap 224A is filled therewith, but the larger filling amount is preferable, since thereby the binding characteristics of the anode active material layer 22B are further improved. The filling amount of the metal material 226 is preferably 20% or more, more preferably 40% or more, and much more preferably 80% or more.

Further, the metal material 226 intrudes into the gap 224B in the anode active material particles 221. More specifically, in the case where the anode active material particles 221 have a multilayer structure, the gap 224B is generated between each layer. The gap 224B causes lowering of the binding characteristics of the anode active material layer 22B as the gap 224A does. Therefore, to improve the binding characteristics, the metal material 226 fills in the gap 224B. In this case, it is enough that part of the gap 224B is filled therewith, but the larger filling amount is preferable, since thereby the binding characteristics of the anode active material layer 22B are further improved.

To prevent the fibrous minute projection (not illustrated) generated on the exposed face of the uppermost layer of the anode active material particles 221 from adversely affecting the performance of the secondary battery, the anode active material layer 22B may have the metal material 226 in the void 225. More specifically, in the case where the anode active material particles 221 are formed by vapor-phase deposition method or the like, the fibrous minute projection sections are generated on the surface thereof, and thus the void 225 is generated between the projection sections. The void 225 causes increase of the surface area of the anode active material particles 221, and accordingly the amount of an irreversible coat formed on the surface is also increased, possibly resulting in lowering of progression of charge and discharge reaction. Therefore, to inhibit the lowering of progression of the charge and discharge reaction, the foregoing void 225 is filled with the metal material 226. In this case, it is enough at minimum that part of the void 225 is filled therewith, but the larger filling amount is preferable, since thereby lowering of progression of the charge and discharge reaction is further inhibited. In FIGS. 6A and 6B, the metal material 226 is dotted on the surface of the uppermost layer of the anode active material particles 221, which means that the foregoing minute projection exists in the location where the metal material 226 is dotted. It is needless to say that the metal material 226 is not necessarily dotted on the surface of the anode active material particles 221, but may cover the entire surface thereof.

In particular, the metal material 226 that intrudes into the gap 224B has a function to fill in the void 205 in each layer. More specifically, in the case where the anode material is deposited several times, the foregoing minute projection is generated on the surface of the anode active material particles 221 for every deposition. Therefore, the metal material 226 fills in not only the gap 224B in each layer, but also the void 225 in each layer.

In FIGS. 5A to 6B, the description has been given of the case that the anode active material particles 221 have the multilayer structure, and both gaps 224A and 224B exist in the anode active material layer 22B. Thus, the anode active material layer 22B has the metal material 226 in the gaps 224A and 224B. Meanwhile, in the case where the anode active material particles 221 have a single layer structure, and only the gap 224A exists in the anode active material layer 22B, the anode active material layer 22B has the metal material 226 only in the gap 224A. It is needless to say that the void 225 is generated in both cases, and thus in any case, the metal material 226 is included in the void 225.

Separator

The separator 23 separates the cathode 21 from the anode 22, and passes lithium ions while preventing current short circuit resulting from contact of both electrodes. As a liquid electrolyte (electrolytic solution), the foregoing electrolyte is impregnated in the separator 23. The separator 23 is made of, for example, a porous film composed of a synthetic resin such as polytetrafluoroethylene, polypropylene, and polyethylene, a ceramics porous film or the like. The separator 23 may be a laminated body composed of two or more porous films.

Electrolytic Solution

The composition of the electrolytic solution is as described for the foregoing electrolyte. The solvent thereof contains halogenated cyclic ester carbonate. The content of the halogenated cyclic ester carbonate in the solvent is not particularly limited, and is able to be arbitrarily set according to the conditions such as a type of the anode active material and the like. Taking an example, in the case where the anode 22 contains a carbon material as an anode active material, the content of the halogenated cyclic ester carbonate in the solvent is preferably from 0.01 wt % to 10 wt % both inclusive. Further, in the case where the anode 22 contains a material containing as an element at least one of silicon and tin as an anode active material, the content of the halogenated cyclic ester carbonate in the solvent is preferably from 0.01 wt % to 50 wt % both inclusive, since thereby decomposition reaction of the electrolytic solution at the time of charge and discharge is sufficiently inhibited.

Operation of Secondary Battery

In the secondary battery, at the time of charge, for example, lithium ions are extracted from the cathode 21, and are inserted in the anode 22 through the electrolytic solution impregnated in the separator 23. Meanwhile, at the time of discharge, for example, lithium ions are extracted from the anode 22, and are inserted in the cathode 21 through the electrolytic solution impregnated in the separator 23.

Method of Manufacturing Secondary Battery

The secondary battery is manufactured, for example, by the following procedure.

First, the cathode 21 is formed. First, a cathode active material is mixed with a cathode binder, a cathode electrical conductor or the like according to needs to prepare a cathode mixture, which is subsequently dispersed in an organic solvent to obtain paste cathode mixture slurry. Subsequently, both faces of the cathode current collector 21A are uniformly coated with the cathode mixture slurry, which is dried to form the cathode active material layer 21B. Finally, the cathode active material layer 21B is compression-molded by using a rolling press machine or the like while being heated if necessary. In this case, the resultant may be compression-molded over several times.

Next, the anode 22 is formed by a procedure similar to that of the foregoing cathode 21. In this case, an anode active material is mixed with an anode binder, an anode electrical conductor or the like according to needs to prepare an anode mixture, which is subsequently dispersed in an organic solvent to form paste anode mixture slurry. After that, both faces of the anode current collector 22A are uniformly coated with the anode mixture slurry to form the anode active material layer 22B. After that, the anode active material layer 22B is compression-molded.

The anode 22 may be formed by a procedure different from that of the cathode 21. In this case, first, the anode material is deposited on both faces of the anode current collector 22A by using vapor-phase deposition method such as evaporation method to form a plurality of anode active material particles. After that, according to needs, an oxide-containing film is formed by using liquid-phase deposition method such as liquid-phase precipitation method, or a metal material is formed by using liquid-phase deposition method such as electrolytic plating method, or both the oxide-containing film and the metal material are formed to form the anode active material layer 22B.

Finally, the secondary battery is assembled by using the cathode 21 and the anode 22. First, the cathode lead 25 is attached to the cathode current collector 21A by welding or the like, and the anode lead 26 is attached to the anode current collector 22A by welding or the like. Subsequently, the cathode 21 and the anode 22 are layered with the separator 23 in between and spirally wound, and thereby the spirally wound electrode body 20 is formed. After that, the center pin 24 is inserted in the center of the spirally wound electrode body. Subsequently, the spirally wound electrode body 20 is sandwiched between the pair of insulating plates 12 and 13, and contained in the battery can 11. In this case, the end of the cathode lead 25 is attached to the safety valve mechanism 15 by welding or the like, and the end of the anode lead 26 is attached to the battery can 11 by welding or the like. Subsequently, the electrolytic solution is injected into the battery can 11 and impregnated in the separator 23. Finally, at the open end of the battery can 11, the battery cover 14, the safety valve mechanism 15, and the PTC device 16 are fixed by being caulked with the gasket 17. The secondary battery illustrated in FIG. 1 and FIG. 2 is thereby completed.

According to the first secondary battery, in the case where the capacity of the anode 22 is expressed by insertion and extraction of lithium ion, the foregoing electrolyte (electrolytic solution) is included. Thus, decomposition reaction of the electrolytic solution at the time of charge and discharge is inhibited. Thus, superior cycle characteristics, superior storage characteristics, and superior swollenness characteristics are able to be obtained.

In particular, in the case where the meat material advantageous to realizing a high capacity as an anode active material of the anode 22 (simple substance of silicon, the SnCoC-containing material or the like) is used, the cycle characteristics are improved. Thus, higher effect is able to be obtained than in a case that other anode material such as a carbon material is used.

Other effect for the first secondary battery is similar to that of the foregoing electrolyte.

2-2. Second Secondary Battery

A second secondary battery is a lithium metal secondary battery in which the anode capacity is expressed by precipitation and dissolution of lithium metal. The secondary battery has a structure similar to that of the first secondary battery, except that the anode active material layer 22B is composed of lithium metal, and is manufactured by a procedure similar to that of the first secondary battery.

In the secondary battery, lithium metal is used as an anode active material, and thereby a higher energy density is able to be obtained. It is possible that the anode active material layer 22B already exists at the time of assembling, or the anode active material layer 22B does not exist at the time of assembling and is to be composed of lithium metal to be precipitated at the time of charge. Further, it is possible that the anode active material layer 22B is used as a current collector as well, and the anode current collector 22A is omitted.

In the secondary battery, when charged, for example, lithium ions are extracted from the cathode 21, and are precipitated as lithium metal on the surface of the anode current collector 22A through the electrolytic solution impregnated in the separator 23. Meanwhile, when discharged, for example, lithium metal is eluded as lithium ions from the anode active material layer 22B, and is inserted in the cathode 21 through the electrolytic solution impregnated in the separator 23.

According to the second secondary battery, in the case where the capacity of the anode 22 is expressed by precipitation and dissolution of lithium metal, the foregoing electrolyte (electrolytic solution) is included. Thus, superior cycle characteristics, superior storage characteristics, and superior swollenness characteristics are able to be obtained by an action similar to that of the first secondary battery. Other effect of the secondary battery is similar to that of the first secondary battery.

2-3. Third Secondary Battery

Figure 7:
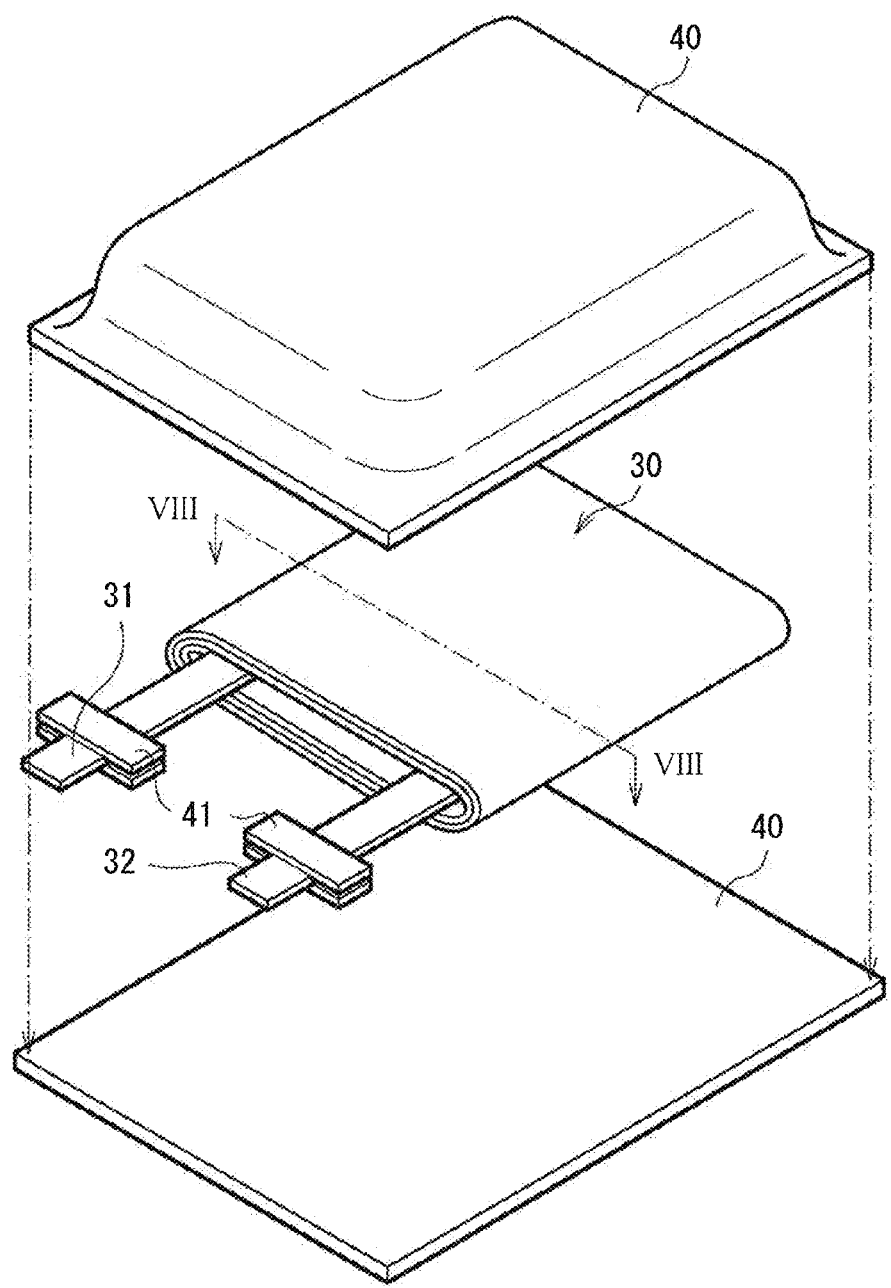
FIG. 7 is an exploded perspective view illustrating a structure of a third secondary battery including the electrolyte according to the embodiment of the invention.
Figure 8:
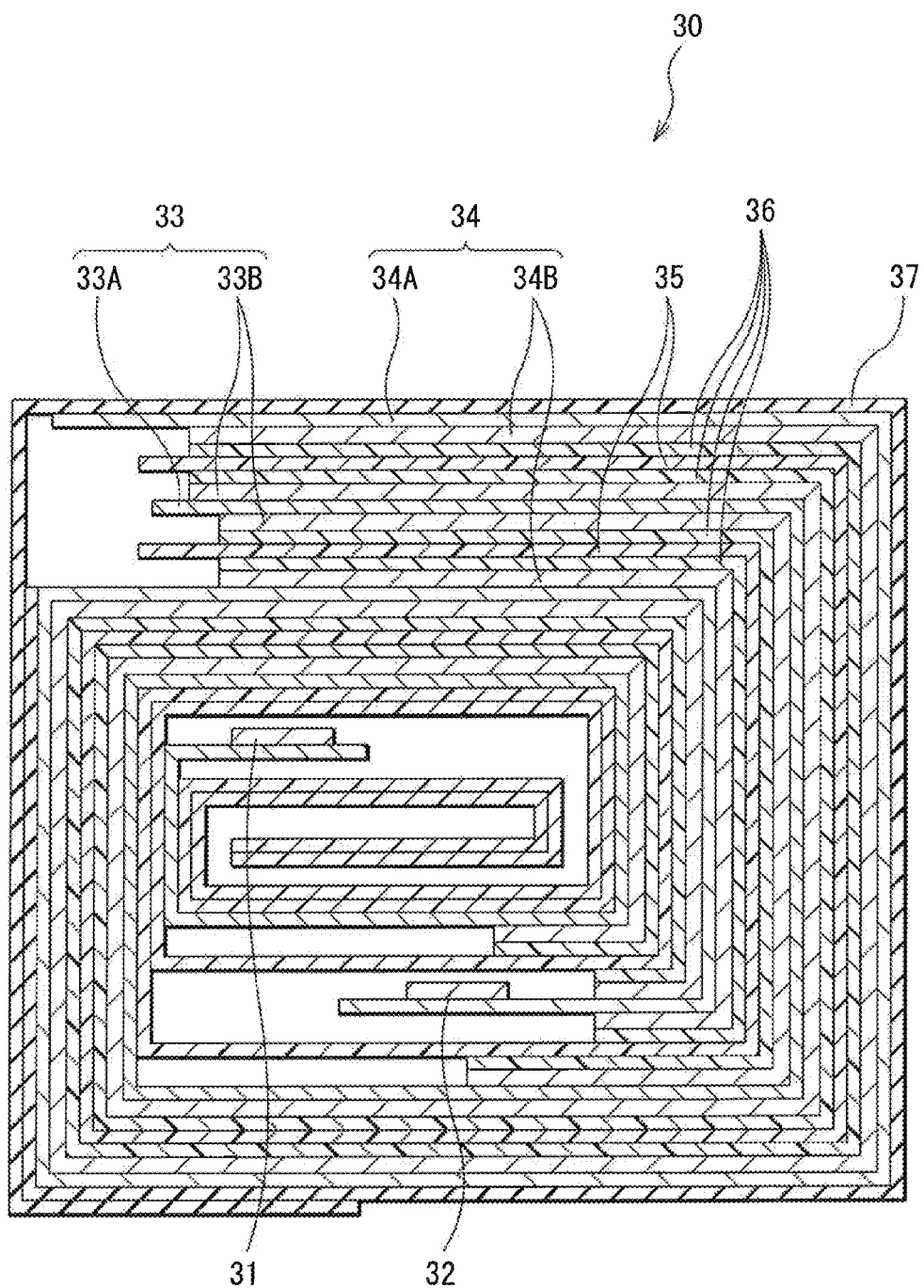
FIG. 8 is a cross sectional view taken along line VIII-VIII of the spirally wound electrode body illustrated in FIG. 7.

FIG. 7 illustrates an exploded perspective structure of a third secondary battery. FIG. 8 illustrates an exploded cross section taken along line VIII-VIII of a spirally wound electrode body 30 illustrated in FIG. 7.

The secondary battery is a lithium ion secondary battery as in the first secondary battery. In the secondary battery, the spirally wound electrode body 30 on which a cathode lead 31 and an anode lead 32 are attached is contained in a film package member 40 mainly. The battery structure using such a package member 40 is called the laminated film type.

The cathode lead 31 and the anode lead 32 are respectively derived from inside to outside of the package member 40 in the same direction, for example. However, arrangement positions of the cathode lead 31 and the anode lead 32 with respect to the spirally wound electrode body 30, derivation directions thereof and the like are not particularly limited. The cathode lead 31 is made of, for example, aluminum or the like, and the anode lead 32 is made of, for example, copper, nickel, stainless or the like. These materials are in the shape of, for example, a thin plate or mesh.

The package member 40 is made of a laminated film in which, for example, a fusion bonding layer, a metal layer, and a surface protective layer are layered in this order. In this case, for example, the respective outer edges of the fusion bonding layer of two films are bonded with each other by fusion bonding, an adhesive or the like so that the fusion bonding layer and the spirally wound electrode body 30 are opposed to each other. Examples of fusion bonding layers include a polymer film made of polyethylene, polypropylene or the like. Examples of metal layers include a metal foil such as an aluminum foil. Examples of surface protective layers include a polymer film made of nylon, polyethylene terephthalate or the like.

Specially, as the package member 40, an aluminum laminated film in which a polyethylene film, an aluminum foil, and a nylon film are layered in this order is preferable. However, the package member 40 may be made of a laminated film having other laminated structure, a polymer film such as polypropylene, or a metal film, instead of the foregoing aluminum laminated film.

An adhesive film 41 to protect from entering of outside air is inserted between the package member 40 and the cathode lead 31, the anode lead 32. The adhesive film 41 is made of a material having contact characteristics with respect to the cathode lead 31 and the anode lead 32. Examples of such a material include, for example, a polyolefin resin such as polyethylene, polypropylene, modified polyethylene, and modified polypropylene.

In the spirally wound electrode body 30, a cathode 33 and an anode 34 are layered with a separator 35 and an electrolyte 36 in between and spirally wound. The outermost periphery thereof is protected by a protective tape 37. The cathode 33 has a structure in which, for example, a cathode active material layer 33B is provided on both faces of a cathode current collector 33A. The structures of the cathode current collector 33A and the cathode active material layer 33B are respectively similar to those of the cathode current collector 21A and the cathode active material layer 21B in the first secondary battery. The anode 34 has a structure in which, for example, an anode active material layer 34B is provided on both faces of an anode current collector 34A. The structures of the anode current collector 34A and the anode active material layer 34B are respectively similar to the structures of the anode current collector 22A and the anode active material layer 22B in the first secondary battery.

The structure of the separator 35 is similar to the structure of the separator 23 in the first secondary battery.

In the electrolyte layer 36, an electrolytic solution is held by a polymer, and other material such as various additives may be contained according to needs. The electrolyte layer 36 is a so-called gel electrolyte. The gel electrolyte is preferable, since high ion conductivity (for example, 1 mS/cm or more at room temperature) is obtained and liquid leakage of the electrolytic solution is prevented.

Examples of polymer compounds include at least one of the following polymer materials. That is, examples thereof include polyacrylonitrile, polyvinylidene fluoride, polytetrafluoroethylene, polyhexafluoropropylene, polyethylene oxide, polypropylene oxide, polyphosphazene, polysiloxane, and polyvinyl fluoride. Further, examples thereof include polyvinyl acetate, polyvinyl alcohol, polymethylmethacrylate, polyacrylic acid, polymethacrylic acid, styrene-butadiene rubber, nitrile-butadiene rubber, polystyrene, and polycarbonate. Further, examples thereof include a copolymer of vinylidene fluoride and hexafluoro propylene. One of these polymer compounds may be used singly, or a plurality thereof may be used by mixture. Specially, polyvinylidene fluoride or the copolymer of vinylidene fluoride and hexafluoro propylene is preferable, since such a polymer compound is electrochemically stable.

The composition of the electrolytic solution is similar to the composition of the electrolytic solution in the first secondary battery. However, in the electrolyte layer 36 as the gel electrolyte, a solvent of the electrolytic solution means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the gel electrolyte layer 36 in which the electrolytic solution is held by the polymer compound, the electrolytic solution may be directly used. In this case, the electrolytic solution is impregnated in the separator 35.

In the secondary battery, at the time of charge, for example, lithium ions are extracted from the cathode 33, and are inserted in the anode 34 through the electrolyte layer 36. Meanwhile, at the time of discharge, for example, lithium ions are extracted from the anode 34, and are inserted in the cathode 33 through the electrolyte layer 36.

The secondary battery including the gel electrolyte layer 36 is manufactured, for example, by the following three procedures.

In the first manufacturing method, first, the cathode 33 and the anode 34 are formed by a procedure similar to that of the cathode 21 and the anode 22 in the first secondary battery. Specifically, the cathode 33 is formed by forming the cathode active material layer 33B on both faces of the cathode current collector 33A, and the anode 34 is formed by forming the anode active material layer 34B on both faces of the anode current collector 34A. Subsequently, a precursor solution containing an electrolytic solution, a polymer compound, and a solvent is prepared. After the cathode 33 and the anode 34 are coated with the precursor solution, the solvent is volatilized to form the gel electrolyte layer 36. Subsequently, the cathode lead 31 is attached to the cathode current collector 33A by welding or the like, and the anode lead 32 is attached to the anode current collector 34A by welding or the like. Subsequently, the cathode 33 and the anode 34 provided with the electrolyte layer 36 are layered with the separator 35 in between and spirally wound to obtain a laminated body. After that, the protective tape 37 is adhered to the outermost periphery thereof to form the spirally wound electrode body 30. Finally, after the spirally wound electrode body 30 is sandwiched between two pieces of film-like package members 40, outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery illustrated in FIG. 7 and FIG. 8 is completed.

In the second manufacturing method, first, the cathode lead 31 is attached to the cathode 33, and the anode lead 32 is attached to the anode 34. Subsequently, the cathode 33 and the anode 34 are layered with the separator 35 in between and spirally wound. After that, the protective tape 37 is adhered to the outermost periphery thereof, and thereby a spirally wound body as a precursor of the spirally wound electrode body 30 is formed. Subsequently, after the spirally wound body is sandwiched between two pieces of the film-like package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte layer 36 is formed. Accordingly, the secondary battery is completed.

In the third manufacturing method, the spirally wound body is formed and contained in the pouch-like package member 40 in the same manner as that of the foregoing second manufacturing method, except that the separator 35 with both faces coated with a polymer compound is used firstly. Examples of polymer compounds with which the separator 35 is coated include a polymer containing vinylidene fluoride as a component (a homopolymer, a copolymer, a multicomponent copolymer or the like). Specific examples thereof include polyvinylidene fluoride, a binary copolymer containing vinylidene fluoride and hexafluoro propylene as a component, and a ternary copolymer containing vinylidene fluoride, hexafluoro propylene, and chlorotrifluoroethylene as a component. As a polymer compound, in addition to the foregoing polymer containing vinylidene fluoride as a component, another one or more polymer compounds may be contained. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted with the cathode 33 and the anode 34 with the polymer compound in between. Thereby, the electrolytic solution is impregnated into the polymer compound, and the polymer compound is gelated to form the electrolyte layer 36. Accordingly, the secondary battery is completed.

In the third manufacturing method, the battery swollenness is inhibited more compared to in the first manufacturing method. Further, in the third manufacturing method, the monomer, the solvent and the like as a raw material of the polymer compound are hardly left in the electrolyte layer 36 compared to the second manufacturing method. In addition, the formation step of the polymer compound is favorably controlled. Thus, sufficient contact characteristics are obtained between the cathode 33/the anode 34/the separator 35 and the electrolyte layer 36.

According to the third secondary battery, in the case where the capacity of the anode 34 is expressed by insertion and extraction of lithium ions, the electrolyte layer 36 contains the foregoing electrolyte (electrolytic solution). Thus, superior cycle characteristics, superior storage characteristics, and superior swollenness characteristics are able to be obtained by an action similar to that of the first secondary battery. Other effect of the secondary battery is similar to that of the first secondary battery. The structure of the third secondary battery is not limited to the structure similar to that of the first secondary battery, but may be a structure similar to that of the second secondary battery.

EXAMPLES

Specific examples of the invention will be described in detail.

Examples 1-1 to 1-14

The laminated film type lithium ion secondary battery illustrated in FIG. 7 and FIG. 8 was fabricated by the following procedure.

First, the cathode 33 was formed. First, lithium carbonate ($Li_2CO_3$) and cobalt carbonate ($CoCO_3$) were mixed at a molar ratio of 0.5:1. After that, the mixture was fired in the air at 900 deg C. for 5 hours. Thereby, lithium—cobalt composite oxide ($LiCoO_2$) was obtained. Subsequently, 91 parts by mass of the lithium—cobalt composite oxide as a cathode active material, 6 parts by mass of graphite as a cathode electrical conductor, and 3 parts by mass of polyvinylidene fluoride as a cathode binder were mixed to obtain a cathode mixture. Subsequently, the cathode mixture was dispersed in N-methyl-2-pyrrolidone to obtain paste cathode mixture slurry. Subsequently, both faces of the cathode current collector 33A were uniformly coated with the cathode mixture slurry by using a coating device, which was dried to form the cathode active material layer 33B. As the cathode current collector 33A, a strip-shaped aluminum foil (thickness: 20 μm) was used. Finally, the cathode active material layer 33B was compression-molded by using a roll pressing machine.

Next, the anode 34 was formed. First, 90 parts by mass of artificial graphite as an anode active material and 10 parts by mass of polyvinylidene fluoride as an anode binder were mixed to obtain an anode mixture. Subsequently, the anode mixture was dispersed in N-methyl-2-pyrrolidone to obtain paste anode mixture slurry. Subsequently, both faces of the anode current collector 34A were uniformly coated with the anode mixture slurry by using a coating device, which was dried to form the anode active material layer 34B. As the anode current collector 34A, a strip-shaped electrolytic copper foil (thickness: 15 μm) was used. Finally, the anode active material layer 34B was compression-molded by using a roll pressing machine.

Next, an electrolytic solution as a liquid electrolyte was prepared. First, ethylene carbonate (EC) and diethyl carbonate (DEC) as a solvent were mixed with halogenated cyclic ester carbonate as other solvent. The composition of EC and DEC (EC:DEC) was 50:50 at a weight ratio. Further, the type and the content of halogenated cyclic ester carbonate were as illustrated in Table 1. After that, lithium hexafluorophosphate ($LiPF_6$) as an electrolyte salt was dissolved in the solvent. The content of the electrolyte salt to the solvent was 1 mol/kg to the solvent.

Finally, the secondary battery was assembled by using the cathode 33, the anode 34, and the electrolytic solution. First, the cathode lead 31 made of aluminum was welded to one end of the cathode current collector 33A, and the anode lead 32 made of nickel was welded to one end of the anode current collector 34A. Subsequently, the cathode 33, the separator 35, the anode 34, and the separator 35 were layered in this order and spirally wound in the longitudinal direction. After that, the end portion of the spirally wound body was fixed by the protective tape 37 made of an adhesive tape, and thereby a spirally wound body as a precursor of the spirally wound electrode body 30 was formed. As the separator 35, a 3-layer structure (thickness: 23 μm) in which a film made of a microporous polyethylene as a main component was sandwiched between films made of a microporous polypropylene as a main component was used. Subsequently, the spirally wound body was sandwiched between the package members 40. After that, outer edges other than an edge of one side of the package members were thermally fusion-bonded with each other. Thereby, the spirally wound body was contained in the package members 40 in a pouched state. As the package member 40, a 3-layer laminated film (total thickness: 100 μm) in which a nylon film (thickness: 30 μm), an aluminum foil (thickness: 40 μm), and a cast polypropylene film (thickness 30 μm) were layered from the outside was used. Subsequently, the electrolytic solution was injected through the opening of the package member 40, the electrolytic solution was impregnated in the separator 35, and thereby the spirally wound electrode body 30 was formed. Finally, the opening of the package member 40 was sealed by thermal fusion bonding in the vacuum atmosphere, and thereby the laminated film type secondary battery was completed. In forming the secondary battery, lithium metal was prevented from being precipitated on the anode 34 in the full charged state by adjusting the thickness of the cathode active material layer 33B.

Examples 1-15 to 1-18

A procedure similar to that of Example 1-4 was executed, except that presence and type of other solvent were changed as illustrated in Table 1. In this case, the halogenated cyclic ester carbonate was not used, or the following other halogenated cyclic ester carbonates were used instead of the relevant halogenated cyclic ester carbonate. Other halogenated cyclic ester carbonates were 4-fluoro-1,3-dioxole-2-one (FEC), trans-4,5-difluoro-1,3-dioxolane-2-one (DFEC), or 4-trifluoromethyl-1,3-dioxole-2-one (FMEC). FEC, DFEC, and FMEC are respectively shown in Formula 7-1, Formula 7-3, and Formula 7-9.

The cycle characteristics and the storage characteristics for the secondary batteries of Examples 1-1 to 1-18 were examined. The results illustrated in Table 1 were obtained.

In examining the cycle characteristics, first, 2 cycles of charge and discharge were performed in the atmosphere at 23 deg C., and the discharge capacity at the second cycle was measured. Subsequently, the secondary battery was charged and discharged repeatedly in the same atmosphere until the total number of cycles became 300 cycles, and thereby the discharge capacity at the 300th cycle was measured. Finally, the cycle discharge capacity retention ratio (%)=(discharge capacity at the 300th cycle/discharge capacity at the second cycle)*100 was calculated. At the time of charge, constant current and constant voltage charge was performed at a current of 0.2 C until the upper voltage of 4.2 V. At the time of discharge, constant current discharge was performed at a current of 0.2 C until the final voltage of 2.7 V. "0.2 C" is a current value at which the theoretical capacity is discharged up in 5 hours.

In examining the storage characteristics, after 2 cycles of charge and discharge were performed in the atmosphere at 23 deg C., the discharge capacity before storage was measured. Subsequently, after the battery that had been charged again was stored in a constant temperature bath at 80 deg C. for 10 days, discharge was performed in the atmosphere at 23 deg C., and the discharge capacity after storage was measured. Finally, the storage discharge capacity retention ratio (%)=(discharge capacity after storage/discharge capacity before storage)*100 was calculated. The charge and discharge conditions were similar to those in the case of examining the cycle characteristics.

The procedures and the conditions in examining the cycle characteristics and the storage characteristics were similarly applied to the following example.

solution contains the halogenated cyclic ester carbonate, superior cycle characteristics and superior storage characteristics are obtained.

Examples 2-1 to 2-13

A procedure similar to that of Examples 1-4 and 1-15 was executed, except that the composition of the electrolytic solution was changed as illustrated in Table 2. In this case,

TABLE 1

Anode active material: artificial graphite

| Table 1 | Solvent | Other solvent Type | Content (wt %) | Electrolyte salt | Cycle discharge capacity retention ratio (%) | Storage discharge capacity retention ratio (%) |
|---|---|---|---|---|---|---|
| Example 1-1 | EC + DEC | 1-1B | 0.01 | LiPF$_6$ | 84 | 88 |
| Example 1-2 | | | 0.5 | 1 mol/kg | 86 | 90 |
| Example 1-3 | | | 1 | | 87 | 91 |
| Example 1-4 | | | 2 | | 87 | 92 |
| Example 1-5 | | | 5 | | 90 | 92 |
| Example 1-6 | | | 10 | | 88 | 90 |
| Example 1-7 | | 1-1A | 0.5 | | 87 | 91 |
| Example 1-8 | | | 1 | | 88 | 90 |
| Example 1-9 | | | 2 | | 89 | 91 |
| Example 1-10 | | | 5 | | 90 | 91 |
| Example 1-11 | | 1-2 | 0.5 | | 86 | 89 |
| Example 1-12 | | | 1 | | 88 | 89 |
| Example 1-13 | | | 2 | | 90 | 90 |
| Example 1-14 | | | 5 | | 90 | 89 |
| Example 1-15 | EC + DEC | — | — | LiPF$_6$ | 82 | 84 |
| Example 1-16 | | FEC | 2 | 1 mol/kg | 86 | 88 |
| Example 1-17 | | DFEC | 2 | | 88 | 89 |
| Example 1-18 | | FMEC | 2 | | 81 | 84 |

In the secondary battery in which the carbon material (artificial graphite) was used as an anode active material, in the case where the halogenated cyclic ester carbonate was used, the cycle discharge capacity retention ratio and the storage discharge capacity retention ratio were equal to or more than those in the case that other halogenated cyclic ester carbonates were used. In this case, in the case where the content of the halogenated cyclic ester carbonate was from 0.01 wt % to 10 wt % both inclusive, more favorable result was obtained. Accordingly, in the secondary battery of the invention, in the case where the artificial graphite is used as an anode active material, if the solvent of the electrolytic solution contains the halogenated cyclic ester carbonate, superior cycle characteristics and superior storage characteristics are obtained.

as a solvent, dimethyl carbonate (DMC), ethylmethyl carbonate (EMC), or propylene carbonate (PC) was used. Further, vinylene carbonate (VC), bis(fluoromethyl)carbonate (DFDMC), FEC, or DFEC was used. Further, propene sultone (PRS), sulfobenzoic anhydride (SBAH), or sulfopropionic anhydride (SPAH) was used. Further, as an electrolyte salt, lithium difluorophosphate (LiPF$_2$O$_2$) was used. In this case, the composition of EC, PC, and DEC (EC:PC:DEC) was 10:20:70 at a weight ratio. The content of VC or the like in the solvent was 2 wt %. The content of LiPF$_2$O$_2$ in the solvent was 0.1 wt %. For the secondary batteries of Examples 2-1 to 2-13, the cycle characteristics and the storage characteristics were examined. The results illustrated in Table 2 were obtained.

TABLE 2

Anode active material: artificial graphite

| Table 2 | Solvent | Other solvent Type | Content (wt %) | Electrolyte salt | Cycle discharge capacity retention ratio (%) | Storage discharge capacity retention ratio (%) |
|---|---|---|---|---|---|---|
| Example 2-1 | EC + DMC | 1-1B | 2 | LiPF$_6$ | 89 | 92 |
| Example 2-2 | EC + EMC | | | 1 mol/kg | 88 | 92 |
| Example 2-3 | PC + DEC | | | | 87 | 92 |
| Example 2-4 | EC + PC + DEC | | | | 88 | 92 |
| Example 2-5 | EC + DEC | VC | | | 93 | 93 |
| Example 2-6 | | DFDMC | | | 94 | 92 |
| Example 2-7 | | FEC | | | 93 | 93 |
| Example 2-8 | | DFEC | | | 94 | 94 |

TABLE 2-continued

| | | Other solvent | | | Cycle discharge capacity retention ratio (%) | Storage discharge capacity retention ratio (%) |
|---|---|---|---|---|---|---|
| Table 2 | Solvent | Type | Content (wt %) | Electrolyte salt | | |
| Example 2-9 | PRS | | | | 87 | 95 |
| Example 2-10 | SBAH | | | | 88 | 95 |
| Example 2-11 | SPAH | | | | 90 | 96 |
| Example 2-12 | EC + DMC | | | $LiPF_6$ 1 mol/kg + $LiPF_2O_2$ | 87 | 93 |
| Example 2-13 | EC + VC DEC | — | — | $LiPF_6$ 1 mol/kg | 84 | 88 |

Anode active material: artificial graphite

In the case where the composition of the electrolytic solution was changed, results similar to those of Table 1 were obtained. In particular, in the case where VC or the like was added and $LiPF_2O_2$ was added, the cycle discharge capacity retention ratio and the storage discharge capacity retention ratio were equal to or more than those in a case that VC or the like and $LiPF_2O_2$ were not added. Accordingly, in the secondary battery of the invention in which the artificial graphite was used as an anode active material, superior cycle characteristics and superior storage characteristics are obtained even if the composition of the electrolytic solution was changed. In particular, in the case where the unsaturated carbon bond cyclic ester carbonate, the halogenated chain ester carbonate, other halogenated cyclic ester carbonates, sultone, or an acid anhydride is used as a solvent, both characteristics are further improved.

Examples 3-1 to 3-3

A procedure similar to that of Example 1-4 was executed, except that the type of electrolyte salt was changed as illustrated in Table 3. In this case, as an electrolyte salt, lithium tetrafluoroborate ($LiBF_4$), the compound shown in Formula 8-6, or lithium bis(trifluoromethanesulfonyl)imide ($LiN(CF_3SO_2)_2$) (LiTFSI) was used. Further, the content of $LiPF_6$ to the solvent was 0.9 mol/kg, and the content of $LiBF_4$ or the like to the solvent was 0.1 mol/kg. For the secondary batteries of Examples 3-1 to 3-3, the cycle characteristics and the storage characteristics were examined. The results illustrated in Table 3 were obtained.

In the case where the type of electrolyte salt was changed, results similar to those of Table 1 were obtained. Accordingly, in the secondary battery of the invention in which the artificial graphite is used as an anode active material, superior cycle characteristics and superior storage characteristics are obtained even if the type of electrolyte salt is changed.

Examples 4-1 to 4-12

A procedure similar to that of Examples 1-5, 2-1, 2-3, 2-4, 2-9 to 2-11, and 1-15 to 1-18 was executed, except that the composition of the electrolytic solution was changed as illustrated in Table 4. In this case, the content of other solvents in the solvent was changed to 5 wt %. Further, as an acid anhydride, propanedisulfonic anhydride (PSAH) was newly used. Further, as an electrolyte salt, $LiBF_4$ was used. The content of $LiPF_6$ to the solvent was 0.9 mol/kg, and the content of $LiBF_4$ to the solvent was 0.1 mol/kg. For the secondary batteries of Examples 4-1 to 4-12, the swollenness characteristics were examined. The results illustrated in Table 4 were obtained.

In examining the swollenness characteristics, to examine the storage characteristics, the thicknesses of the secondary battery before and after storage in a bath were measured and the difference between the thickness before storage and the thickness after storage was regarded as swollenness (mm). The foregoing procedure and the foregoing conditions in examining the swollenness characteristics were similarly applied to the following examples.

TABLE 3

Anode active material: artificial graphite

| | | Other solvent | | | Cycle discharge capacity retention ratio (%) | Storage discharge capacity retention ratio (%) |
|---|---|---|---|---|---|---|
| Table 3 | Solvent | Type | Content (wt %) | Electrolyte salt | | |
| Example 3-1 | EC + DEC | 1-1B | 2 | $LiPF_6$ 0.9 mol/kg | $LiBF_4$ 0.1 mol/kg | 87 | 94 |
| Example 3-2 | | | | | 8-6 0.1 mol/kg | 90 | 94 |
| Example 3-3 | | | | | LiTFSI 0.1 mol/kg | 87 | 94 |

TABLE 4

| Table 4 | Solvent | Other solvent Type | Content (wt %) | Electrolyte salt | Swollenness (mm) |
|---|---|---|---|---|---|
| Example 1-5 | EC + DEC | 1-1B | 5 | LiPF$_6$ | 1.22 |
| Example 4-1 | EC + DMC | | | 1 mol/kg | 1.92 |
| Example 4-2 | PC + DEC | | | | 0.85 |
| Example 4-3 | EC + PC + DEC | | | | 1.10 |
| Example 4-4 | EC + PRS | | | | 0.62 |
| Example 4-5 | DEC  SBAH | | | | 0.70 |
| Example 4-6 | SPAH | | | | 0.62 |
| Example 4-7 | PSAH | | | | 0.55 |
| Example 4-8 | | | | LiPF$_6$  LiBF$_4$ 0.9 mol/kg  0.1 mol/kg | 0.32 |
| Example 4-9 | EC + DEC | — | — | LiPF$_6$ | 0.52 |
| Example 4-10 | | FEC | 5 | 1 mol/kg | 0.80 |
| Example 4-11 | | DFEC | 5 | | 2.11 |
| Example 4-12 | | FMEC | 5 | | 0.52 |

In the secondary battery in which the artificial graphite was used as an anode active material, if the halogenated cyclic ester carbonate was used, the swollenness was equal to or less than that of the case in which other halogenated cyclic ester carbonate was used. Accordingly, in the secondary battery of the invention, in the case where the artificial graphite is used as an anode active material, if the solvent of electrolytic solution contains the halogenated cyclic ester carbonate, superior swollenness characteristics are obtained.

From the results of Table 1 to Table 4, the following tendency is derived.

First, by focusing attention on cycle characteristics and storage characteristics, in the case where Formula 1-1B or the like, FEC, or DFEC is used, the cycle discharge capacity retention ratio and the storage discharge capacity retention ratio are higher than those in a case that Formula 1-1B or the like, FEC, or DFEC is not used. In this case, the cycle discharge capacity retention ratio and the storage discharge capacity retention ratio are increased in the order of FEC, Formula 1-1B or the like, and DFEC. The result shows that to improve the cycle characteristics and the storage characteristics, Formula 1-1B is more advantageous than FEC, and DFEC is more advantageous than Formula 1-1B or the like.

Meanwhile, by focusing attention on swollenness characteristics, in the case where Formula 1-1B or the like, FEC, or DFEC is used, the swollenness is higher than those in a case that Formula 1-1B or the like, FEC, or DFEC is not used. In this case, the swollenness is increased in the order of FEC, Formula 1-1B or the like, and DFEC. The result shows that to improve the swollenness characteristics, Formula 1-1B is more advantageous than DFEC, and FEC is more advantageous than Formula 1-1B or the like.

In the case where FMEC is used, the storage discharge capacity retention ratio and the swollenness are retained equally to in a case that Formula 1-1B or the like, FEC, or DFEC is not used, but the cycle discharge capacity retention ratio is lower than that in a case that Formula 1-1B or the like, FEC, or DFEC is not used. The result shows that FMEC is advantageous to improving the storage characteristics and the swollenness characteristics, but is radically disadvantageous to improving the cycle characteristics as the most important characteristics of the secondary battery.

Accordingly, in the case where Formula 1-1B or the like is used, both the cycle characteristics and the storage characteristics are more favorable than those in a case that FEC or DFEC is used. That is, in the case where FEC or DFEC is used, while one of the cycle characteristics and the storage characteristics is significantly favorable, the other characteristics are significantly lowered. However, in the case where Formula 1-1B or the like is used, both characteristics are favorable. Further, in the case where Formula 1-1B or the like is used, while the storage characteristics and the swollenness characteristics are inhibited from being largely lowered to the same degree as that in a case that FEC or DFEC is used, and the cycle characteristics are improved compared to a case that FMEC is used. Therefore, in the invention, in the case where the carbon material (artificial graphite) is used as an anode active material, if the solvent of the electrolytic solution contains the halogenated cyclic ester carbonate (Formula 1-1B or the like), all of the cycle characteristics, the storage characteristics, and the swollenness characteristics are favorable.

Examples 5-1 to 5-19

A procedure similar to that of Examples 1-1 to 1-18 was executed, except that the anode 34 was formed by using silicon as an anode active material, and the content of the halogenated cyclic ester carbonate was changed as illustrated in Table 5. In forming the anode 34, silicon was deposited on the surface of the anode current collector 34A by using evaporation method (electron beam evaporation method) to form the anode active material layer 34B containing a plurality of anode active material particles. In this case, 10 times of deposition steps were repeated to obtain the total thickness of the anode active material layer 22B of 6 μm. For the secondary batteries of Examples 5-1 to 5-19, the cycle characteristics and the storage characteristics were examined. The results illustrated in Table 5 were obtained.

TABLE 5

Anode active material: silicon

| Table 5 | Solvent | Other solvent Type | Content (wt %) | Electrolyte salt | Cycle discharge capacity retention ratio (%) | Storage discharge capacity retention ratio (%) |
|---|---|---|---|---|---|---|
| Example 5-1 | EC + DEC | 1-1B | 0.01 | $LiPF_6$ | 45 | 88 |
| Example 5-2 | | | 1 | 1 mol/kg | 50 | 90 |
| Example 5-3 | | | 2 | | 60 | 91 |
| Example 5-4 | | | 5 | | 74 | 92 |
| Example 5-5 | | | 10 | | 90 | 92 |
| Example 5-6 | | | 20 | | 90 | 90 |
| Example 5-7 | | | 50 | | 90 | 90 |
| Example 5-8 | | 1-1A | 1 | | 50 | 91 |
| Example 5-9 | | | 5 | | 74 | 90 |
| Example 5-10 | | | 10 | | 88 | 91 |
| Example 5-11 | | | 20 | | 90 | 91 |
| Example 5-12 | | 1-2 | 1 | | 52 | 89 |
| Example 5-13 | | | 5 | | 89 | 90 |
| Example 5-14 | | | 10 | | 90 | 90 |
| Example 5-15 | | | 20 | | 90 | 89 |
| Example 5-16 | EC + DEC | — | — | $LiPF_6$ | 40 | 83 |
| Example 5-17 | | FEC | 5 | 1 mol/kg | 66 | 90 |
| Example 5-18 | | DFEC | 5 | | 80 | 90 |
| Example 5-19 | | FMEC | 5 | | 38 | 80 |

In the secondary battery in which the metal material (silicon) was used as an anode active material, results equal to those of Table 1 were obtained. That is, in the case where the halogenated cyclic ester carbonate was used, the cycle discharge capacity retention ratio and the storage discharge capacity retention ratio were equal to more than those in the case that other halogenated cyclic ester carbonates were used. In this case, in the case where the content of the halogenated cyclic ester carbonate was from 0.01 wt % to 50 wt % both inclusive, more favorable result was obtained. Accordingly, in the secondary battery of the invention, in the case where silicon is used as an anode active material, if the solvent of the electrolytic solution contains the halogenated cyclic ester carbonate, superior cycle characteristics and superior storage characteristics are obtained.

Examples 6-1 to 6-13

A procedure similar to that of Examples 2-1 to 2-13 was executed, except that silicon was used as an anode active material as in Examples 5-1 to 5-19. For the secondary batteries of Examples 6-1 to 6-13, the cycle characteristics and the storage characteristics were examined. The results illustrated in Table 6 were obtained.

TABLE 6

Anode active material: silicon

| Table 6 | Solvent | Other solvent Type | Content (wt %) | Electrolyte salt | Cycle discharge capacity retention ratio (%) | Storage discharge capacity retention ratio (%) |
|---|---|---|---|---|---|---|
| Example 6-1 | EC + DMC | 1-1B | 5 | $LiPF_6$ | 77 | 92 |
| Example 6-2 | EC + EMC | | | 1 mol/kg | 77 | 92 |
| Example 6-3 | PC + DEC | | | | 72 | 92 |
| Example 6-4 | EC + PC + DEC | | | | 72 | 92 |
| Example 6-5 | EC + VC | | | | 85 | 93 |
| Example 6-6 | DEC  DFDMC | | | | 82 | 92 |
| Example 6-7 | FEC | | | | 82 | 92 |
| Example 6-8 | DFEC | | | | 88 | 93 |
| Example 6-9 | PRS | | | | 74 | 95 |
| Example 6-10 | SBAH | | | | 75 | 95 |
| Example 6-11 | SPAH | | | | 78 | 96 |
| Example 6-12 | EC + DMC | | | $LiPF_6$ 1 mol/kg + $LiPF_2O_2$ | 74 | 93 |
| Example 6-13 | EC + VC DEC | — | — | $LiPF_6$ 1 mol/kg | 70 | 88 |

In the case where the composition of the electrolytic solution was changed, results similar to those of Table 5 were obtained. Accordingly, in the secondary battery of the invention in which silicon is used as an anode active material, superior cycle characteristics and superior storage characteristics are obtained even if the composition of the solvent is changed.

Examples 7-1 to 7-3

A procedure similar to that of Examples 3-1 to 3-3 was executed, except that silicon was used as an anode active material as in Examples 5-1 to 5-19 as illustrated in Table 7. For the secondary batteries of Examples 7-1 to 7-3, the cycle characteristics and the swollenness characteristics were examined. The results illustrated in Table 7 were obtained.

TABLE 7

| Table 7 | Solvent | Other solvent Type | Content (wt %) | Electrolyte salt | | Cycle discharge capacity retention ratio (%) | Storage discharge capacity retention ratio (%) |
|---|---|---|---|---|---|---|---|
| Example 7-1 | EC + DEC | 1-1B | 5 | LiPF$_6$ 0.9 mol/kg | LiBF$_4$ 0.1 mol/kg | 74 | 91 |
| Example 7-2 | | | | | 8-6 0.1 mol/kg | 77 | 93 |
| Example 7-3 | | | | | LiTFSI 0.1 mol/kg | 74 | 92 |

In the case where the type of electrolyte salt was changed, results similar to those of Table 3 were obtained. Accordingly, in the secondary battery of the invention in which silicon is used as an anode active material, superior cycle characteristics and superior storage characteristics are obtained even if the type of electrolyte salt is changed.

Examples 8-1 to 8-12

A procedure similar to that of Examples 4-1 to 4-12 was executed, except that silicon was used as an anode active material as in Examples 5-1 to 5-19 as illustrated in Table 8. For the secondary batteries of Examples 8-1 to 8-12, the swollenness characteristics were examined. The results illustrated in Table 8 were obtained.

In the case where silicon was used as an anode active material, results similar to those of Table 4 were obtained. That is, in the case where the halogenated cyclic ester carbonate was used, the swollenness was equal to or less than that in the case that other halogenated cyclic ester carbonates were used. Accordingly, in the secondary battery of the invention, in the case where silicon is used as an anode active material, if the solvent of the electrolytic solution contains the halogenated cyclic ester carbonate, superior swollenness characteristics are obtained.

From the results of Table 5 to Table 8, tendency similar to that of Table 1 to Table 4 is derived. That is, in the case where Formula 1-1B or the like is used, both the cycle characteristics and the storage characteristics are more favorable than those in a case that FEC or DFEC is used. Further, in the case where Formula 1-1B or the like is used, while the storage characteristics and the swollenness characteristics are inhibited from being largely lowered, and the cycle characteristics are improved compared to a case that FMEC is used. Therefore, in the invention, in the case where the material containing silicon as an element is used as an anode active material, if the solvent of the electrolytic solution contains the halogenated cyclic ester carbonate (Formula 1-1B or the like), all of the cycle characteristics, the storage characteristics, and the swollenness characteristics are favorable.

TABLE 8

| Table 8 | Solvent | Other solvent Type | Content (wt %) | Electrolyte salt | | Swollenness (mm) |
|---|---|---|---|---|---|---|
| Example 5-4 | EC + DEC | 1-1B | 5 | LiPF$_6$ | | 1.52 |
| Example 8-1 | EC + DMC | | | 1 mol/kg | | 2.22 |
| Example 8-2 | PC + DEC | | | | | 1.15 |
| Example 8-3 | EC + PC + DEC | | | | | 1.30 |
| Example 8-4 | EC + PRS | | | | | 0.65 |
| Example 8-5 | DMC  SBAH | | | | | 0.72 |
| Example 8-6 | SPAH | | | | | 0.61 |
| Example 8-7 | PSAH | | | | | 0.56 |
| Example 8-8 | | | | LiPF$_6$ 0.9 mol/kg | LiBF$_4$ 0.1 mol/kg | 0.86 |
| Example 8-9 | EC + DEC | — | — | LiPF$_6$ | | 0.62 |
| Example 8-10 | | FEC | 5 | 1 mol/kg | | 1.20 |
| Example 8-11 | | DFEC | 5 | | | 2.41 |
| Example 8-12 | | FMEC | 5 | | | 0.62 |

Examples 9-1 to 9-4

A procedure similar to that of Examples 5-4 and 5-16 to 5-18 was executed, except that the anode 34 was formed by using the SnCoC-containing material as an anode active material.

In forming the anode 34, first, cobalt powder and tin powder were alloyed to obtain cobalt tin alloy powder. After that, the resultant was added with carbon powder and dry-mixed. Subsequently, 10 g of the foregoing mixture and about 400 g of a corundum being 9 mm in diameter were set in a reaction container of a planetary ball mill (Ito Seisakusho Co. make). Subsequently, inside of the reaction container was substituted with argon atmosphere. After that, 10 minute operation at 250 rpm and 10 minute break were repeated until the total operation time reached 20 hours. Subsequently, the reaction container was cooled down to room temperature and the SnCoC-containing material was taken out. After that, the resultant was screened through a 280 mesh sieve to remove coarse grain.

Figure 9:
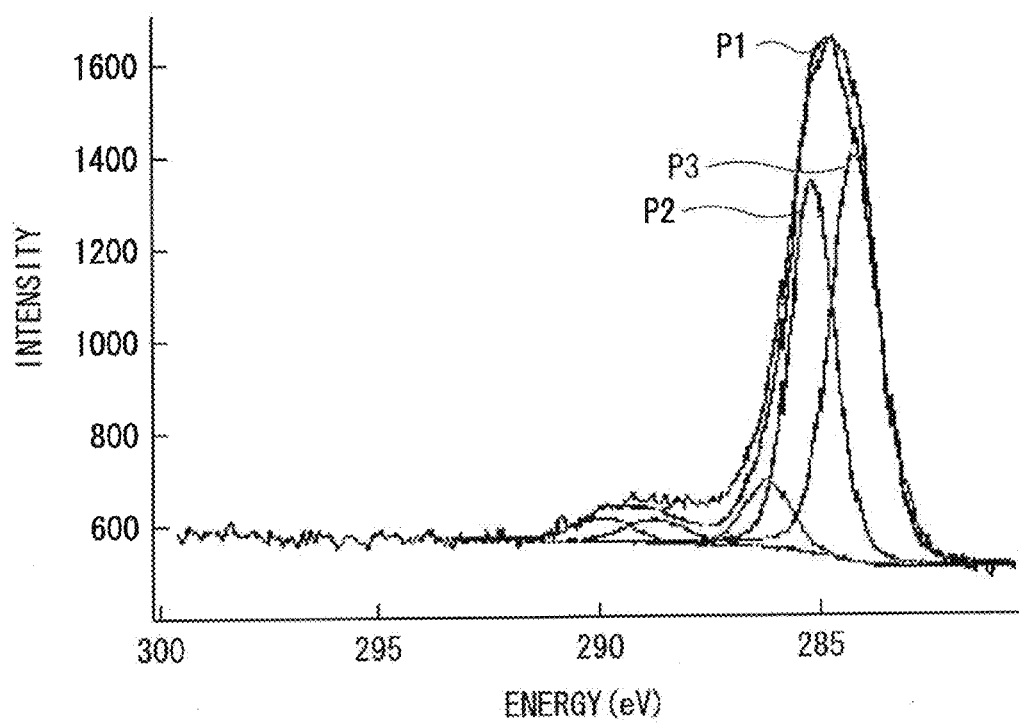
FIG. 9 is a diagram illustrating an analytical result of a SnCoC-containing material by XPS.

The composition of the obtained SnCoC-containing material was analyzed. The tin content was 49.5 wt %, the cobalt content was 29.7 wt %, the carbon content was 19.8 wt %, and the ratio of tin and cobalt (Co/(Sn+Co)) was 37.5 wt %. At this time, the tin content and the cobalt content were measured by Inductively Coupled Plasma (ICP) emission analysis, and the carbon content was measured by carbon sulfur analysis equipment. Further, the SnCoC-containing material was analyzed by X-ray diffraction method. A diffraction peak having a half bandwidth in the range of $2\theta=20$ to 50 deg was observed. Further, when the SnCoC-containing material was analyzed by XPS, as illustrated in FIG. 9, peak P1 was obtained. When the peak P1 was analyzed, peak P2 of the surface contamination carbon and peak P3 of C1 s in the SnCoC-containing material existing on the lower energy side (region lower than 284.8 eV) were obtained. From the result, it was confirmed that carbon in the SnCoC-containing material was bonded with other element.

After the SnCoC-containing material was obtained, 80 parts by mass of the SnCoC-containing material as an anode active material, 8 parts by mass of polyvinylidene fluoride as an anode binder, 11 parts by mass of graphite as an anode electrical conductor, and 1 part by mass of acetylene black were mixed to obtain an anode mixture. Subsequently, the anode mixture was dispersed in N-methyl-2-pyrrolidone to obtain paste anode mixture slurry. Finally, both faces of the anode current collector 22A were uniformly coated with the anode mixture slurry by using a coating device and the resultant was dried to form the anode active material layer 34B. After that, the coating was compression-molded by using a rolling press machine.

For the secondary batteries of Examples 9-1 to 9-4, the cycle characteristics and the swollenness characteristics were examined. The results illustrated in Table 9 were obtained.

TABLE 9

| Anode active material: SnCoC-containing material | | | | | | |
|---|---|---|---|---|---|---|
| | | Other solvent | | | Cycle discharge capacity retention | Storage discharge capacity retention |
| Table 9 | Solvent | Type | Content (wt %) | Electrolyte salt | ratio (%) | ratio (%) |
| Example 9-1 | EC + DEC | 1-1B | 5 | LiPF$_6$ 1 mol/kg | 88 | 90 |
| Example 9-2 | EC + DEC | — | — | LiPF$_6$ | 76 | 70 |
| Example 9-3 | | FEC | 5 | 1 mol/kg | 84 | 90 |
| Example 9-4 | | DFEC | 5 | | 90 | 90 |

In the secondary battery in which the metal material (SnCoC-containing material) was used as an anode active material, results similar to those of Table 5 were obtained. That is, in the case where the halogenated cyclic ester carbonate was used, the cycle discharge capacity retention ratio and the storage discharge capacity retention ratio were equal to or more than those in the case that other halogenated cyclic ester carbonates were used. Accordingly, in the secondary battery of the invention, in the case where the SnCoC-containing material was used as an anode active material, if the solvent of the electrolytic solution contains the halogenated cyclic ester carbonate, superior cycle characteristics and superior storage characteristics are obtained.

Examples 10-1 to 10-13 and 11-1 to 11-12

A procedure similar to that of Examples 6-1 to 6-13 and 8-1 to 8-12 was executed, except that the SnCoC-containing material was used as an anode active material as in Examples 9-1 to 9-4 as illustrated in Table 10 and Table 11. For the secondary batteries of Examples 10-1 to 10-13 and 11-1 to 11-12, the cycle characteristics and the swollenness characteristics were examined. The results illustrated in Table 10 and Table 11 were obtained.

TABLE 10

Anode active material: SnCoC-containing material

| Table 10 | Solvent | Other solvent Type | Content (wt %) | Electrolyte salt | Cycle discharge capacity retention ratio (%) | Storage discharge capacity retention ratio (%) |
|---|---|---|---|---|---|---|
| Example 10-1 | EC + DMC | 1-1B | 5 | LiPF$_6$ 1 mol/kg | 90 | 92 |
| Example 10-2 | EC + EMC | | | | 88 | 92 |
| Example 10-3 | PC + DEC | | | | 87 | 92 |
| Example 10-4 | EC + PC + DEC | | | | 88 | 92 |
| Example 10-5 | EC + VC | | | | 91 | 93 |
| Example 10-6 | DEC | DFDMC | | | 90 | 92 |
| Example 10-7 | | FEC | | | 90 | 92 |
| Example 10-8 | | DFEC | | | 94 | 93 |
| Example 10-9 | | PRS | | | 88 | 95 |
| Example 10-10 | | SBAH | | | 88 | 95 |
| Example 10-11 | | SPAH | | | 89 | 95 |
| Example 10-12 | EC + DMC | | | LiPF$_6$ 1 mol/kg + LiPF$_2$O$_2$ | 88 | 94 |
| Example 10-13 | EC + VC DEC | — | — | LiPF$_6$ 1 mol/kg | 87 | 91 |

TABLE 11

Anode active material: SnCoC-containing material

| Table 11 | Solvent | Other solvent Type | Content (wt %) | Electrolyte salt | Swollenness (mm) |
|---|---|---|---|---|---|
| Example 9-1 | EC + DEC | 1-1B | 5 | LiPF$_6$ 1 mol/kg | 1.54 |
| Example 11-1 | EC + DMC | | | | 2.42 |
| Example 11-2 | PC + DEC | | | | 1.04 |
| Example 11-3 | EC + PC + DEC | | | | 1.32 |
| Example 11-4 | EC + | PRS | | | 0.72 |
| Example 11-5 | DMC | SBAH | | | 0.80 |
| Example 11-6 | | SPAH | | | 0.72 |
| Example 11-7 | | PSAH | | | 0.65 |
| Example 11-8 | | | | LiPF$_6$ LiBF$_4$ 0.9 mol/kg 0.1 mol/kg | 0.52 |
| Example 11-9 | EC + DEC | — | — | LiPF$_6$ 1 mol/kg | 0.75 |
| Example 11-10 | | FEC | 5 | | 1.40 |
| Example 11-11 | | DFEC | 5 | | 2.51 |
| Example 11-12 | | FMEC | 5 | | 0.62 |

In the case where the SnCoC-containing material was used as an anode active material, results similar to those of Table 6 and Table 8 were obtained. That is, in the case where the halogenated cyclic ester carbonate was used, the swollenness was equal to or less than that in the case that other halogenated cyclic ester carbonates were used. Accordingly, in the secondary battery of the invention in which the SnCoC-containing material is used, even if the composition of the solvent is changed, superior cycle characteristics and superior storage characteristics are obtained, and in the case where the solvent contains the halogenated cyclic ester carbonate, superior swollenness characteristics are obtained.

Examples 12-1 to 12-12

A procedure similar to that of Examples 5-4 and 5-16 to 5-18 was executed, except that both the oxide-containing film and the metal material or one thereof was formed as illustrated in Table 12.

In forming the oxide-containing film, first, a plurality of anode active material particles were formed by a procedure similar to that of Examples 5-1 to 5-19. After that, silicon oxide (SiO$_2$) was precipitated on the surface of the anode active material particles by using liquid-phase precipitation method. In this case, the anode current collector 34A on which the anode active material particles were formed is dipped in a solution in which boron as an anion capture agent was dissolved in hydrofluosilic acid for three hours, and the silicon oxide was precipitated on the surface of the anode active material particles. After that, the resultant was washed with water and then dried under reduced pressure.

In forming the metal material, with the use of electrolytic plating method, a current was applied while air was supplied to a plating bath to grow a cobalt (Co) plating film in a gap between each anode active material particle. In this case, a cobalt plating solution (Japan Pure Chemical Co., Ltd. make) was used as a plating solution, the current density was from 2 A/cm$^2$ to 5 A/cm$^2$ both inclusive, and the plating rate was 10 msec.

For the secondary batteries of Examples 12-1 to 12-12, the cycle characteristics and the storage characteristics were examined. The results illustrated in Table 12 were obtained.

TABLE 12

Anode active material: silicon

| Table 12 | Anode Oxide-containing film | Anode Metal material | Electrolytic solution Solvent | Electrolytic solution Other solvent Type | Electrolytic solution Other solvent Content (wt %) | Electrolyte salt | Cycle discharge capacity retention ratio (%) | Storage discharge capacity retention ratio (%) |
|---|---|---|---|---|---|---|---|---|
| Example 12-1 | SiO$_2$ | — | EC + DEC | 1-1B | 5 | LiPF$_6$ | 87 | 92 |
| Example 12-2 | — | Co | | | | 1 mol/kg | 87 | 92 |
| Example 12-3 | SiO$_2$ | Co | | | | | 93 | 92 |
| Example 12-4 | SiO$_2$ | — | EC + DEC | — | — | LiPF$_6$ | 70 | 85 |
| Example 12-5 | | | | FEC | 5 | 1 mol/kg | 82 | 92 |
| Example 12-6 | | | | DFEC | 5 | | 92 | 92 |
| Example 12-7 | — | Co | EC + DEC | — | — | LiPF$_6$ | 65 | 80 |
| Example 12-8 | | | | FEC | 5 | 1 mol/kg | 85 | 92 |
| Example 12-9 | | | | DFEC | 5 | | 90 | 92 |
| Example 12-10 | SiO$_2$ | Co | EC + DEC | — | — | LiPF$_6$ | 72 | 84 |
| Example 12-11 | | | | FEC | 5 | 1 mol/kg | 88 | 92 |
| Example 12-12 | | | | DFEC | 5 | | 92 | 92 |

In the case where the oxide-containing material and the metal material were formed, results similar to those of Table 5 were obtained. In particular, in the case where both the oxide-containing material and the metal material were formed, the cycle discharge capacity retention ratio and the storage discharge capacity retention ratio were equal to or more than those in a case that only one thereof was formed. Accordingly, in the secondary battery of the invention, in the case where the oxide-containing material and the metal material are formed, the cycle characteristics are further improved.

From the foregoing results of Table 1 to Table 12, in the secondary battery of the invention, since the solvent of the electrolytic solution contains the halogenated cyclic ester carbonate, superior cycle characteristics, superior storage characteristics, and superior swollenness characteristics are able to be obtained without depending on the type of the anode active material, the composition of the electrolytic solution, presence of the oxide-containing material and the metal material and the like.

In this case, the increase ratios of the cycle discharge capacity retention ratio and the storage discharge capacity retention ratio in the case that the metal material (silicon or the SnCoC-containing material) was used as an anode active material were larger than those in the case that the carbon material (artificial graphite) was used as an anode active material. Accordingly, higher effect is able to be obtained in the case that the metal material (silicon or the SnCoC-containing material) was used as an anode active material than in the case that the carbon material (artificial graphite) was used as an anode active material. The result may be obtained for the following reason. That is, in the case where the metal material advantageous to realizing a high capacity was used as an anode active material, the electrolytic solution was more easily decomposed than in a case that the carbon material was used. Accordingly, decomposition inhibition effect of the electrolytic solution was significantly demonstrated.

The invention has been described with reference to the embodiment and the examples. However, the invention is not limited to the aspects described in the foregoing embodiment and the foregoing examples, and various modifications may be made. For example, use application of the electrolyte of the invention is not necessarily limited to the secondary battery, but may be other electrochemical device. Examples of other use applications include a capacitor.

Further, in the foregoing embodiment and the foregoing examples, the description has been given of the lithium ion secondary battery or the lithium metal secondary battery as a secondary battery type. However, the secondary battery of the invention is not limited thereto. The invention is able to be similarly applied to a secondary battery in which the anode capacity includes the capacity by insertion and extraction of lithium ions and the capacity associated with precipitation and dissolution of lithium metal, and the anode capacity is expressed by the sum of these capacities. In this case, an anode material capable of inserting and extracting lithium ions is used as an anode active material, and the chargeable capacity of the anode material is set to a smaller value than the discharge capacity of the cathode.

Further, in the foregoing embodiment and the foregoing examples, the description has been given with the specific examples of the case in which the battery structure is the cylindrical type or the laminated film type, and with the specific example in which the battery element has the spirally wound structure. However, applicable structures are not limited thereto. The secondary battery of the invention is able to be similarly applied to a battery having other battery structure such as a square type battery, a coin type battery, and a button type battery or a battery in which the battery element has other structure such as a laminated structure.

Further, in the foregoing embodiment and the foregoing examples, the description has been given of the case using lithium as an electrode reactant element, but the electrode reactant element is not necessarily limited thereto. As an electrode reactant element, for example, other Group 1 element such as sodium (Na) and potassium (K), a Group 2 element such as magnesium and calcium, or other light metal such as aluminum may be used. The effect of the invention is able to be obtained without depending on the electrode reactant element type, and thus even if the electrode reactant element type is changed, similar effect is able to be obtained.

Further, in the foregoing embodiment and the foregoing examples, for the content of the halogenated cyclic ester carbonate, the description has been given of the appropriate range derived from the results of the examples. However, the description does not totally deny a possibility that the content is out of the foregoing range. That is, the foregoing appropriate range is the range particularly preferable for obtaining the effects of the invention. Therefore, as long as effect of the invention is obtained, the content may be out of the foregoing range in some degrees.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A secondary battery comprising:
   a cathode;
   an anode; and
   an electrolyte containing a solvent and an electrolyte salt, wherein the solvent contains a first halogenated cyclic ester carbonate shown in Formula 2:

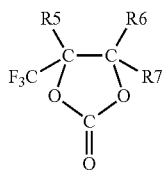

Formula 2 where R5 to R7 are a hydrogen group, a halogen group, or an alkyl group, and at least one thereof is a halogen group, wherein R5 to R7 comprise one or two carbons in the alkyl group,
wherein the solvent contains a second halogenated cyclic ester carbonate shown in Formula 7, the second halogenated cyclic ester carbonate being different than the first halogenated cyclic ester carbonate:

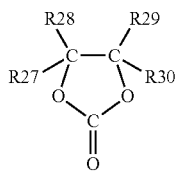

Formula 7 where R27 to R30 are a hydrogen group, a halogen group, an alkyl group, or a halogenated alkyl group, and at least one of R27 to R30 is the halogen group or the halogenated alkyl group, wherein R27 to R30 comprise one or two carbons in the alkyl group or the halogenated alkyl group, wherein the content of the first halogenated cyclic ester carbonate and the second halogenated cyclic ester carbonate in the solvent is from 0.01 wt % to 50% wt %, and
wherein the solvent contains unsaturated carbon bond cyclic ester carbonates, the unsaturated carbon bond cyclic ester carbonates being catechol carbonate.

2. The secondary battery according to claim 1, wherein the first halogenated cyclic ester carbonate shown in the Formula 2 is a compound shown in Formula 1-1 to Formula 1-9

Formulas 1-1 to 1-9

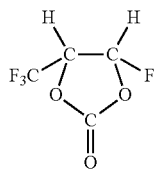 (1-1)

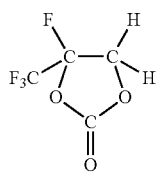 (1-2)

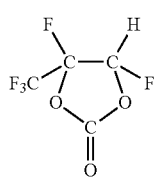 (1-3)

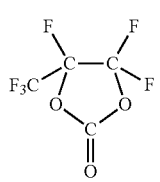 (1-4)

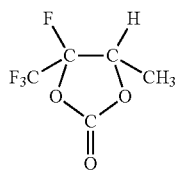 (1-5)

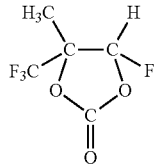 (1-6)

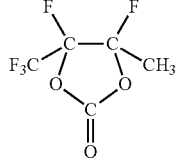 (1-7)

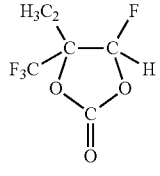 (1-8)

-continued (1-9)

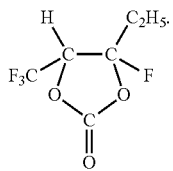

3. The secondary battery according to claim 2, wherein the first halogenated cyclic ester carbonate shown in the Formula 2 is the compound shown in the Formula 1-1 or the compound shown in the Formula 1-2.

4. The secondary battery according to claim 1, wherein the anode contains a carbon material, lithium metal (Li), or a material that is able to insert and extract an electrode reactant and contains as an element at least one of a metal element and a metalloid element as an anode active material.

5. The secondary battery according to claim 1, wherein the anode contains a material that contains at least one of silicon (Si) and tin (Sn) as an anode active material.

6. The secondary battery according to claim 5, wherein the material that contains as an element at least one of silicon and tin is a simple substance of silicon or a SnCoC-containing material containing tin, cobalt (Co), and carbon (C) as an element, and in the SnCoC-containing material, a content of carbon is from 9.9 wt % to 29.7 wt % both inclusive, a ratio of tin and cobalt (Co/(Sn+Co)) is from 20 wt % to 70 wt % both inclusive, and a half bandwidth of a diffraction peak obtained by X-ray diffraction is 1.0 deg or more.

7. The secondary battery according to claim 1, wherein the anode contains a carbon material as an anode active material, and a content of the first halogenated cyclic ester carbonate in the solvent is from 0.01 wt % to 10 wt % both inclusive.

8. The secondary battery according to claim 1, wherein the electrolyte salt contains at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), and compounds shown in Formula 8 to Formula 13:

Formula 8

(8)

where X31 is a Group 1 element or a Group 2 element in the long period periodic table or aluminum (Al); M31 is a transition metal element, a Group 13 element, a Group 14 element, or a Group 15 element in the long period periodic table; R31 is a halogen group; Y31 is —(O═)C—R32-C(═O)—, —(O═)C—C(R33)2-, or —(O═)C—C(═O)—; R32 is an alkylene group, a halogenated alkylene group, an arylene group, or a halogenated arylene group; R33 is an alkyl group, a halogenated alkyl group, an aryl group, or a halogenated aryl group; a3 is one of integer numbers 1 to 4; b3 is 0, 2, or 4; and c3, d3, m3, and n3 are one of integer numbers 1 to 3;

Formula 9

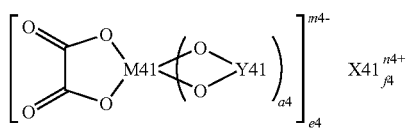

(9)

where X41 is a Group 1 element or a Group 2 element in the long period periodic table; M41 is the transition metal element, or a Group 13 element, a Group 14 element, or a Group 15 element in the long period periodic table; Y41 is —(O═)C—(C(R41)$_2$)$_{b4}$-C(═O)—, —(R43)$_2$C—(C(R42)$_2$)$_{c4}$-C(═O)—, —(R43)$_2$C—(C(R42)$_2$)$_{c4}$-C(R43)$_2$-, —(R43)$_2$C—(C(R42)$_2$)$_{c4}$-S(═O)$_2$—, —(O═)$_2$S—(C(R42)$_2$)$_{d4}$-S(═O)$_2$—, or —(O═)C—(C(R42)$_2$)$_{d4}$-S(═O)$_2$—; R41 and R43 are a hydrogen group, an alkyl group, a halogen group, or a halogenated alkyl group; at least one of R41 and R43 is respectively the halogen group or the halogenated alkyl group; R42 is a hydrogen group, an alkyl group, a halogen group, or a halogenated alkyl group; a4, e4, and n4 are 1 or 2; b4 and d4 are one of integer numbers 1 to 4; c4 is one of integer numbers 0 to 4; and f4 and m4 are one of integer numbers 1 to 3;

Formula 10

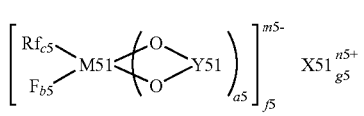

(10)

where X51 is a Group 1 element or a Group 2 element in the long period periodic table; M51 is the transition metal element, or a Group 13 element, a Group 14 element, or a Group 15 element in the long period periodic table;

Rf is a fluorinated alkyl group with the carbon number from 1 to 10 both inclusive or a fluorinated aryl group with the carbon number from 1 to 10 both inclusive;

Y51 is —(O═)C—(C(R51)$_2$)$_{d5}$-C(═O)—, —(R52)$_2$C—(C(R51)$_2$)$_{d5}$-C(═O)—, —(R52)$_2$C—(C(R51)$_2$)$_{d5}$-C(R52)$_2$-, —(R52)$_2$C—(C(R51)$_2$)$_{d5}$-S(═O)$_2$—, —(O═)$_2$S—(C(R51)$_2$)$_{e5}$-S(═O)$_2$—, or —(O═)C—(C(R51)$_2$)$_{e5}$-S(═O)$_2$—; R51 is a hydrogen group, an alkyl group, a halogen group, or a halogenated alkyl group; R52 is a hydrogen group, an alkyl group, a halogen group, or a halogenated alkyl group, and at least one thereof is the halogen group or the halogenated alkyl group; a5, f5, and n5 are 1 or 2; b5, c5, and e5 are one of integer numbers 1 to 4; d5 is one of integer numbers 0 to 4; and g5 and m5 are one of integer numbers 1 to 3;

Formula 11

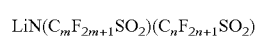

(11)

where m and n are an integer number of 1 or more;

Formula 12

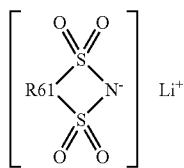 (12)

where R61 is a straight chain or branched perfluoro alkylene group with the carbon number from 2 to 4 both inclusive; and Formula 13

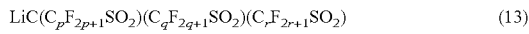 (13)

where p, q, and r are an integer number of 1 or more.

9. The secondary battery according to claim 1, wherein the anode has an anode active material layer on an anode current collector, and the anode active material layer is formed by at least one of vapor-phase deposition method, liquid-phase deposition method, and firing method.

10. The secondary battery according to claim 1, wherein the anode has an anode active material layer containing a plurality of anode active material particles, and the anode active material layer includes an oxide-containing film that covers a surface of the anode active material particles.

11. The secondary battery according to claim 10, wherein the oxide-containing film contains at least one of an oxide of silicon, an oxide of germanium (Ge), and an oxide of tin.

12. The secondary battery according to claim 1, wherein the anode has an anode active material layer containing a plurality of anode active material particles, and the anode active material layer contains a metal material containing a metal element not being alloyed with an electrode reactant as an element in a gap inside the anode active material layer.

13. The secondary battery according to claim 12, wherein the metal element is at least one of iron (Fe), cobalt (Co), nickel (Ni), zinc (Zn), and copper (Cu).

14. The secondary battery according to claim 1, wherein the cathode and the anode are able to insert and extract lithium ion as an electrode reactant.

15. The secondary battery according to claim 1, wherein the second halogenated cyclic ester carbonate is 4-fluoro-1,3-dioxolane-2-one or 4,5-difluoro-1,3-dioxolane-2-one.

16. An electrolyte containing a solvent and an electrolyte salt, wherein the solvent contains a first halogenated cyclic ester carbonate shown in Formula 2:

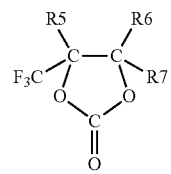 (2)

where R5 to R7 are a hydrogen group, a halogen group, or an alkyl group, and at least one thereof is a halogen group, wherein R5 to R7 comprise one or two carbons in the alkyl group, wherein the solvent contains a second halogenated cyclic ester carbonate shown in Formula 7, the second halogenated cyclic ester carbonate being different than the first halogenated cyclic ester carbonate:

Formula 7

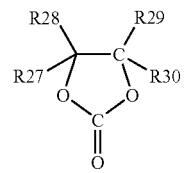 (7)

where R27 to R30 are a hydrogen group, a halogen group, an alkyl group, or a halogenated alkyl group, and at least one of R27 to R30 is the halogen group or the halogenated alkyl group, wherein R27 to R30 comprise one or two carbons in the alkyl group or the halogenated alkyl group, wherein the content of the first halogenated cyclic ester carbonate and the second halogenated cyclic ester carbonate in the solvent is from 0.01 wt % to 50% wt %, and wherein the solvent contains unsaturated carbon bond cyclic ester carbonates, the unsaturated carbon bond cyclic ester carbonates being catechol carbonate.

17. The electrolyte according to claim 16 is used for a secondary battery.

* * * * *